US010661867B2

(12) United States Patent
Zheng et al.

(10) Patent No.: US 10,661,867 B2
(45) Date of Patent: May 26, 2020

(54) UNDERWATER DRONE WITH CAPACITY OF FISHING, RAPIDLY MOVING AND WIRELESS REMOTE CONTROL

(71) Applicant: POWERVISION TECH INC., Beijing (CN)

(72) Inventors: Weifeng Zheng, Beijing (CN); Zhixiong He, Beijing (CN); Di Zheng, Beijing (CN); Hailiang Wu, Beijing (CN); Jie Tang, Beijing (CN); Guangzhang Wu, Beijing (CN)

(73) Assignee: PowerVision Tech Inc., Beijing (CN)

( * ) Notice: Subject to any disclaimer, the term of this patent is extended or adjusted under 35 U.S.C. 154(b) by 94 days.

(21) Appl. No.: 15/847,880

(22) Filed: Dec. 19, 2017

(65) Prior Publication Data

US 2018/0111669 A1 Apr. 26, 2018

Related U.S. Application Data

(63) Continuation-in-part of application No. PCT/CN2016/093121, filed on Aug. 3, 2016.

(30) Foreign Application Priority Data

Feb. 18, 2016 (CN) .......................... 2016 1 0091376
Jun. 21, 2016 (CN) .......................... 2016 1 0454324
(Continued)

(51) Int. Cl.
*B63G 8/00* (2006.01)
*B63G 8/16* (2006.01)
(Continued)

(52) U.S. Cl.
CPC .............. *B63G 8/001* (2013.01); *A01K 87/00* (2013.01); *B63B 22/003* (2013.01); *B63G 8/16* (2013.01);
(Continued)

(58) Field of Classification Search
CPC .... B63G 8/00; B63G 8/001; B63G 2008/002; B63G 2008/004; B63G 2008/005;
(Continued)

(56) References Cited

U.S. PATENT DOCUMENTS 5,370,074 A * 12/1994 Knudsen ................. B63C 11/48
114/312
D677,211 S * 3/2013 Tavares ........................ D12/308
(Continued)

FOREIGN PATENT DOCUMENTS

CN 2130765 Y 4/1993
CN 1265364 A 9/2000
(Continued)

*Primary Examiner* — Ajay Vasudeva
(74) *Attorney, Agent, or Firm* — Winston Hsu

(57) ABSTRACT

An underwater drone is disclosed. The underwater drone includes a horizontal propeller module and a vertical propeller module to respectively provide a drone body with a horizontal proceeding force and a vertical lifting or diving force. The underwater drone includes a horizontal channel and a vertical channel, which allow the water to pass through for reducing resistance when the underwater drone moves forwards, upwards or downwards. The underwater drone is equipped with a buoy member with an antenna portion of a communication module disposed therein. The underwater drone is equipped with the fishing device, the fish finding device and the image capturing module. Therefore, the underwater drone is capable of fishing, rapidly moving and wireless remote control.

8 Claims, 24 Drawing Sheets

(30) Foreign Application Priority Data

Jan. 4, 2017 (CN) .......................... 2017 1 0004597
Apr. 6, 2017 (CN) ..................... 2017 2 0356181 U

(51) Int. Cl.

| | | |
|---|---|---|
| B63G 8/39 | (2006.01) | |
| H04N 7/18 | (2006.01) | |
| G01S 15/96 | (2006.01) | |
| G01S 19/13 | (2010.01) | |
| H04W 76/10 | (2018.01) | |
| A01K 87/00 | (2006.01) | |
| B63B 22/00 | (2006.01) | |

(52) U.S. Cl.
CPC ............... *B63G 8/39* (2013.01); *G01S 15/96* (2013.01); *H04N 7/185* (2013.01); *B63B 2213/02* (2013.01); *B63G 2008/004* (2013.01); *B63G 2008/007* (2013.01); *G01S 19/13* (2013.01); *H04W 76/10* (2018.02)

(58) Field of Classification Search
CPC ...... B63G 2008/007; B63G 8/08; B63G 8/14; B63G 8/16
See application file for complete search history.

(56) References Cited

U.S. PATENT DOCUMENTS

| | | | | |
|---|---|---|---|---|
| 9,227,709 | B1 * | 1/2016 | Schill | B63H 23/326 |
| 9,738,360 | B2 * | 8/2017 | Habeger | B63G 8/38 |
| D830,943 | S * | 10/2018 | Zheng | D12/308 |
| 10,106,233 | B2 * | 10/2018 | Lichter | B63G 8/001 |
| 10,322,783 | B2 * | 6/2019 | Valsvik | B63B 3/13 |
| D860,331 | S * | 9/2019 | Zheng | D21/424 |
| 10,472,035 | B2 * | 11/2019 | Grant | B63G 8/001 |
| D869,374 | S * | 12/2019 | Chen | D12/308 |
| 2010/0252711 | A1 | 10/2010 | Buchner | |
| 2018/0222560 | A1 * | 8/2018 | Postic | G01V 1/3808 |

FOREIGN PATENT DOCUMENTS

| | | |
|---|---|---|
| CN | 101386340 A | 3/2009 |
| CN | 101475055 A | 7/2009 |
| CN | 101825903 A | 9/2010 |
| CN | 201630146 U | 11/2010 |
| CN | 102306025 A | 1/2012 |
| CN | 202728535 U | 2/2013 |
| CN | 102975833 A | 3/2013 |
| CN | 202815220 U | 3/2013 |
| CN | 202904345 U | 4/2013 |
| CN | 103448877 A | 12/2013 |
| CN | 203773053 U | 8/2014 |
| CN | 104199447 A | 12/2014 |
| CN | 104385284 A | 3/2015 |
| CN | 105028356 A | 11/2015 |
| CN | 105028357 A | 11/2015 |
| CN | 105046232 A | 11/2015 |
| CN | 105095875 A | 11/2015 |
| CN | 204775946 U | 11/2015 |
| CN | 105191879 A | 12/2015 |
| CN | 204937441 U | 1/2016 |
| CN | 205524893 U | 8/2016 |
| CN | 205539451 U | 8/2016 |
| CN | 106240774 A | 12/2016 |
| CN | 106628026 A | 5/2017 |
| CN | 107092019 A | 8/2017 |
| CN | 206579799 U | 10/2017 |
| CN | 206620727 U | 11/2017 |
| CN | 208360444 U | 1/2019 |
| JP | 10-20382 A | 1/1998 |
| JP | 2004-333261 A | 11/2004 |

* cited by examiner

UNDERWATER DRONE WITH CAPACITY OF FISHING, RAPIDLY MOVING AND WIRELESS REMOTE CONTROL

CROSS REFERENCE TO RELATED APPLICATIONS

This application is a continuation in part of PCT/CN2016/093121, filed on Aug. 3, 2016.

This application claims the benefit of CN 201710004597.0, which was filed on Jan. 4, 2017, and the benefit of CN 201720356181.0, which was filed on Apr. 6, 2017, and is incorporated herein by reference.

BACKGROUND OF THE INVENTION

1. Field of the Invention

The present invention relates to an underwater drone, and more particularly, to an underwater drone with capacity of fishing, rapidly moving and wireless remote control.

2. Description of the Prior Art

Recently, an underwater drone which is capable of diving and moving underwater has been gradually in entertainment purpose of people's daily life, such as taking photos and recording videos underwater. However, resistance of water resists the underwater drone from moving rapidly. Furthermore, the conventional underwater drone is equipped with a cable connected therewith for communication with a shore remote control. However, the cable often wraps with water plants or is stuffed by objects, such as stones, underwater, and the cable is not convenient for carrying and storing. In addition, the conventional underwater drone is not able to carry stuff, such as fishing equipment, which results in lack of entertainment.

SUMMARY OF THE INVENTION

Thus, the present invention provides an underwater drone with capacity of fishing, rapidly moving and wireless remote control for solving above drawbacks.

For the aforesaid purposes, the present invention aims at providing an underwater drone with capacity of fishing. The underwater drone includes a drone body, a horizontal propeller module, a vertical propeller module and a fishing device. The drone body has a longitudinal axis, and the drone body being arranged along the longitudinal axis. The horizontal propeller module is disposed on the drone body and oriented substantially parallel to the longitudinal axis. The horizontal propeller module is for driving the drone body to move along the longitudinal axis or to rotate about a vertical axis perpendicular to the longitudinal axis. The vertical propeller module is disposed on the drone body and oriented substantially parallel to the vertical axis. The vertical propeller module is for driving the drone body to rotate about a lateral axis perpendicular to the longitudinal axis and the vertical axis. The fishing device is disposed on the drone body. The fishing device is for fishing when the horizontal propeller module and the vertical propeller module cooperatively drive the drone body to a location at which fish are.

According to an embodiment of the present invention, the fishing device includes a fishing rod and a fish catching member set. The fishing rod has a rod body, a first connecting end and a second connecting end opposite to the first connecting end. The first connecting end is connected to the drone body. The fish catching member set is connected to the second connecting end and for catching the fish.

According to an embodiment of the present invention, the fishing device further includes a connecting member, a constraining member and a fixing member. The connecting member is fixed on the drone body. The constraining member is disposed through the connecting member and connected to the first connecting end. The fixing member is for fixing the connecting member and the constraining member.

According to an embodiment of the present invention, an inner space with an opening is formed in the connecting member, a through hole is formed on the connecting member and communicates with the inner space, the constraining member is disposed in the inner space via the opening, the fishing rod further has a protruding platform protruding from the first connecting end, the protruding platform abuts against the constraining member via the through hole, the fixing member connects the protruding platform and the constraining member.

According to an embodiment of the present invention, the fishing rod further has a protruding flange protruding from the protruding platform. The connecting member includes a base portion and a head portion. The base portion is for fixing with the drone body. The head portion is connected to the base portion. The head portion has a top wall. The top wall movably engages between the constraining member and the protruding flange.

According to an embodiment of the present invention, a first constraining slot is formed on the protruding platform, and a second constraining slot is formed on the drone body. The constraining member has a first constraining protrusion and a second constraining protrusion. The first constraining protrusion engages with the first constraining slot, and the second constraining protrusion engages with the second constraining slot.

According to an embodiment of the present invention, the fishing device further comprises a floating member disposed on the rod body, a density of the floating member being smaller than a density of water.

According to an embodiment of the present invention, the fish catching member set includes a holding post, a fishing ball and a fishing line-hook assembly. The holding post protrudes from the second connecting end. The fishing ball is installed on the holding post. The fishing line-hook assembly is wound on the fishing ball.

According to an embodiment of the present invention, the underwater drone further includes a central processing unit disposed in the drone body. The fishing device includes a device releasing unit, a device carrying unit and a fish catching member set. The device releasing unit is disposed on the drone body and coupled to the central processing unit. The device carrying unit is detachably disposed on the device releasing unit. The fish catching member set is installed on the device carrying unit and for catching the fish. The central processing unit drives the device releasing unit to release the device carrying unit, so as to release the fish catching member set.

According to an embodiment of the present invention, the device releasing unit is an electromagnetic module, and the device carrying unit is made of permeable material. The device releasing unit is turned on to carry the device carrying unit by the central processing unit, and the device releasing unit is turned off to release the device carrying unit by the central processing unit.

According to an embodiment of the present invention, a connecting hole is formed on the device carrying unit, and the fish catching member set includes a fish line and a fish hook. The fish line is connected to the drone body and disposed through the connecting hole. The fish hook is connected to the fish line.

According to an embodiment of the present invention, the fish catching member set further includes a floating buoy installed on the fish line.

According to an embodiment of the present invention, the underwater drone further includes a fish finding device installed on the drone body and for finding the location at which the fish are. The fish finding device includes a sonar module and a fish attracting module. The sonar module is for emitting sound waves and for receiving the reflected sound waves. The fish attracting module is coupled with the sonar module, and the fish attracting module illuminating for attracting the fish.

For the aforesaid purposes, the present invention aims at providing an underwater drone with capacity of rapidly moving. The drone body includes an upper casing assembly, a lower casing assembly and a drone kernel. The lower casing assembly is coupled with the upper casing assembly. An accommodating space is formed between the upper casing assembly and the lower casing assembly. The drone kernel is installed in the accommodating space. The horizontal propeller module is installed on the drone kernel and the vertical propeller module is installed on the drone kernel. A side portion of the upper casing assembly, a side portion of the lower casing assembly and the horizontal propeller module cooperatively form a horizontal channel, and the horizontal channel allows liquids to pass through. An upper opening is formed on the upper casing assembly. A lower opening is formed on the lower casing assembly. A kernel channel is formed on the drone kernel. The vertical propeller module is installed inside the kernel channel. The upper opening, the lower opening and the kernel channel cooperatively form a vertical channel, and the vertical channel allows the liquids to pass through.

According to an embodiment of the present invention, the upper casing assembly includes a top housing and an upper lateral housing. The top housing has a top channel structure located in a position corresponding to the horizontal propeller module. An upper portion of the horizontal channel is surrounded by the top channel structure. The upper lateral housing is for installing the top housing with the drone kernel. The upper lateral housing has an upper liquid guiding portion. The upper liquid guiding portion is connected to a propeller frond end of the horizontal propeller module and for guiding the liquids to the upper portion of the horizontal channel.

According to an embodiment of the present invention, the lower casing assembly includes a bottom housing and a lower lateral housing. The bottom housing has a bottom channel structure located in a position corresponding to the horizontal propeller module and the top channel structure. A lower portion of the horizontal channel is surrounded by the bottom channel structure. The lower lateral housing is for installing the bottom housing with the drone kernel. The lower lateral housing has a lower liquid guiding portion corresponding to the upper liquid guiding portion. The lower liquid guiding portion is connected to the propeller frond end of the horizontal propeller module and for guiding the liquids to the lower portion of the horizontal channel.

According to an embodiment of the present invention, the upper casing assembly further includes an upper filter structure disposed in the upper opening and for filtering an object from entering the kernel channel via the upper opening.

According to an embodiment of the present invention, the lower casing assembly further includes a lower filter structure disposed in the lower opening and for filtering the object from entering the kernel channel via the lower opening.

According to an embodiment of the present invention, the drone body has a drone front end and a drone rear end. The longitudinal axis passes through the drone front end and the drone rear end. A distance between the horizontal propeller module and the drone rear end is smaller than a distance between the horizontal propeller module and the drone front end. The vertical propeller module is disposed between the drone front end and a gravity center of the underwater drone along the longitudinal axis.

For the aforesaid purposes, the present invention aims at providing an underwater drone with capacity of wireless remote control. The underwater drone includes a remote terminal, an image capturing module, a fish finding device, a communication module and a central processing unit. The image capturing module is disposed on the drone body, and the image capturing module is for capturing images or recording videos. The fish finding device is installed on the drone body and for finding the location at which the fish are. The fish finding device includes a sonar module and a fish attracting module. The sonar module is for emitting sound waves and for receiving the reflected sound waves. The fish attracting module is coupled with the sonar module, and the fish attracting module illuminates for attracting the fish. The communication module is coupled with the drone body and for establishing communication with the remote terminal. The central processing unit is coupled with the image capturing module, the fish finding device and the communication module. The central processing unit is for controlling the image capturing module and the fish finding device according to the communication between the communication module and the remote terminal.

According to an embodiment of the present invention, the underwater drone further includes a cable connects the drone body with the remote terminal. The remote terminal is coupled with the communication module and the central processing unit via the cable.

According to an embodiment of the present invention, the communication module includes an antenna module, and the underwater drone further includes a buoy member and a wire. The buoy member is separate from the drone body and for being floated on a surface of water. The antenna module is disposed in the buoy member. The wire connects the buoy member with the drone body. The antenna module is coupled to the central processing unit via the wire.

According to an embodiment of the present invention, the underwater drone further includes a wire rolling module installed on the drone body. The wire rolling module is for rewinding or releasing the wire.

According to an embodiment of the present invention, the wire rolling module includes a rolling device and a rolling controller. The rolling device is disposed on the drone body. The rolling controller is coupled to the rolling device and the central processing unit. The rolling controller is controlled by the central processing unit, so as to drive the rolling device to rewind or release the wire.

According to an embodiment of the present invention, the communication module includes a global positioning system (GPS) module. The GPS module is disposed in the buoy member and coupled to the central processing unit. The GPS module is for receiving a satellite signal and for sending a position message of the underwater drone to the remote terminal, and the communication module is a wireless digital data link (DDL) module.

According to an embodiment of the present invention, the underwater drone further includes an auto navigating module for receiving a destination message sent from the remote terminal. The auto navigating module and the central processing unit control the horizontal propeller module and the vertical propeller module to drive the drone body to a destination defined by the destination message according to the satellite signal received by the GPS module.

In summary, the underwater drone of the present invention includes the horizontal propeller module and the vertical propeller module to respectively provide the drone body with a horizontal proceeding force and a vertical lifting or diving force. Furthermore, the underwater drone of the present invention includes the horizontal channel and the vertical channel, which allow the water to pass through for reducing resistance when the underwater drone moves forwards, upwards or downwards. As a result, the underwater drone is capable of rapidly moving. Furthermore, the underwater drone of the present invention can be equipped with the buoy member with the antenna portion of the communication module disposed therein. As a result, the antenna portion of the communication module is able to establish the connection with the remote control in a wireless manner without being affected by signal decay by water. Furthermore, the underwater drone of the present invention can be equipped with the fishing device, the fish finding device and the image capturing module. It allows the user to find fish, capture images or recording videos, and catch the fish, which results in increase of interests of use of the underwater drone.

These and other objectives of the present invention will no doubt become obvious to those of ordinary skill in the art after reading the following detailed description of the preferred embodiment that is illustrated in the various figures and drawings.

DETAILED DESCRIPTION

In the following detailed description of the embodiments, reference is made to the accompanying drawings which form a part hereof, and in which is shown by way of illustration specific embodiments in which the invention may be practiced. In this regard, directional terminology, such as "top," "bottom," etc., is used with reference to the orientation of the Figure(s) being described. The components of the present invention can be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the present invention. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless limited otherwise, the terms "connected," and "installed" and variations thereof herein are used broadly and encompass direct and indirect connections and installations. Accordingly, the drawings and descriptions will be regarded as illustrative in nature and not as restrictive.

Figure 1:
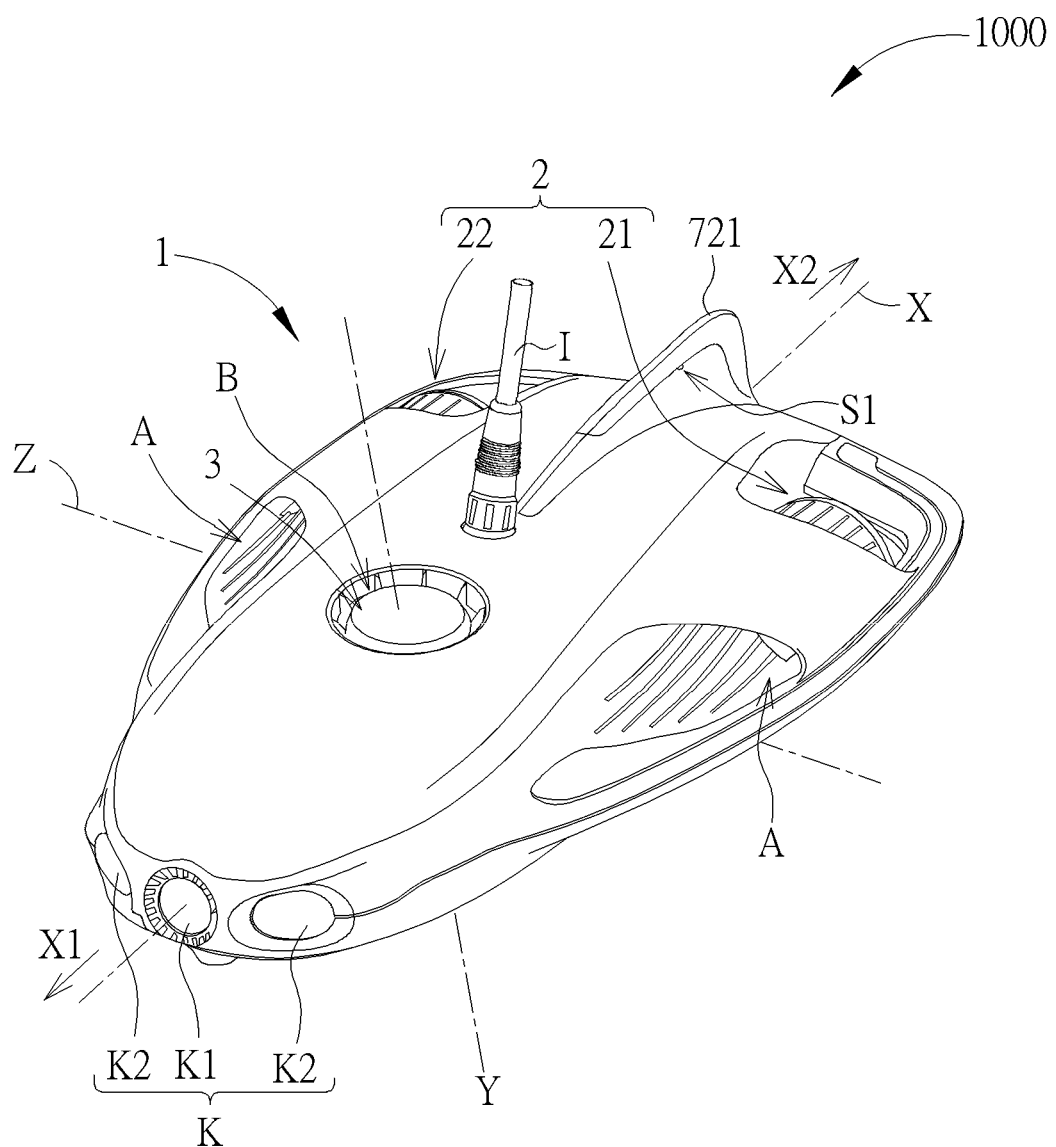
FIG. 1 is a diagram of an underwater drone according to a first embodiment of the present invention.
Figure 2:
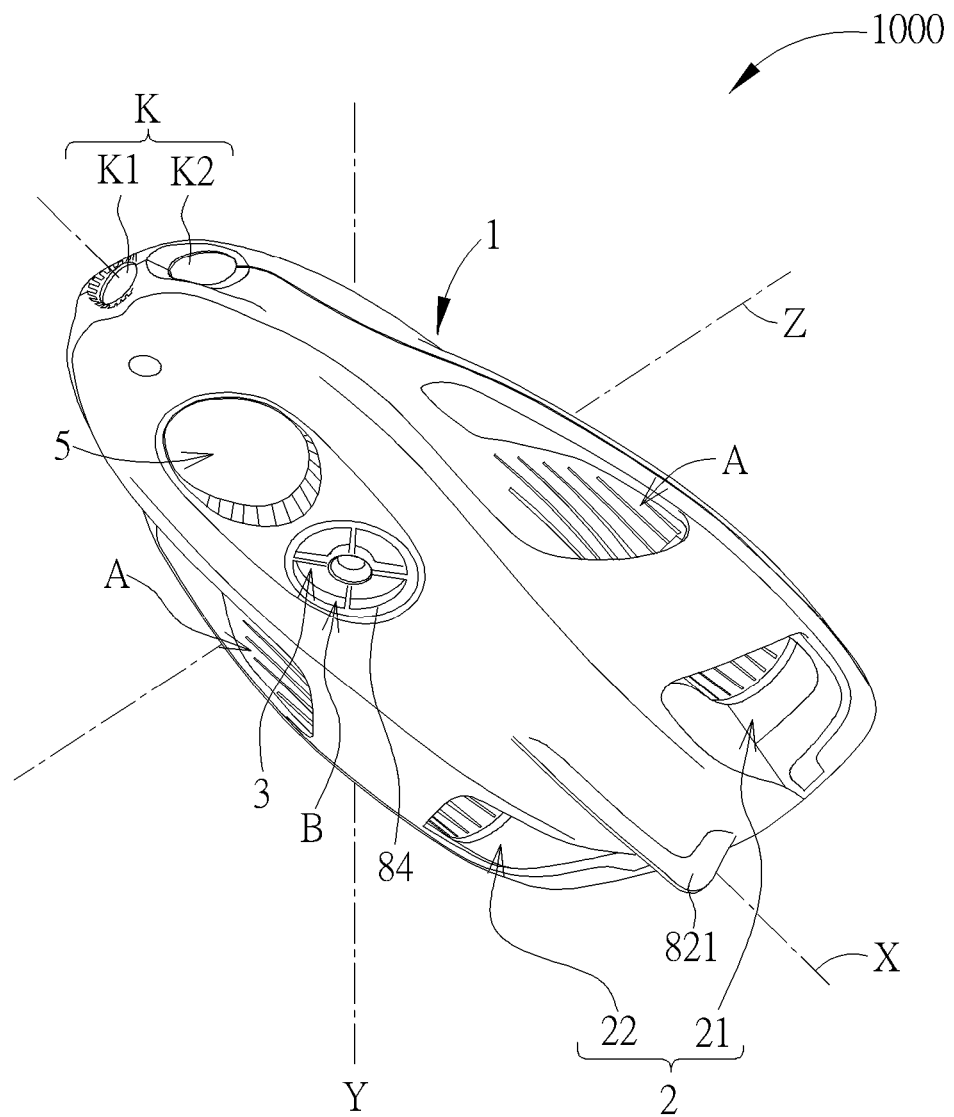
FIG. 2 is a diagram of the underwater drone in another view according to the first embodiment of the present invention.
Figure 3:
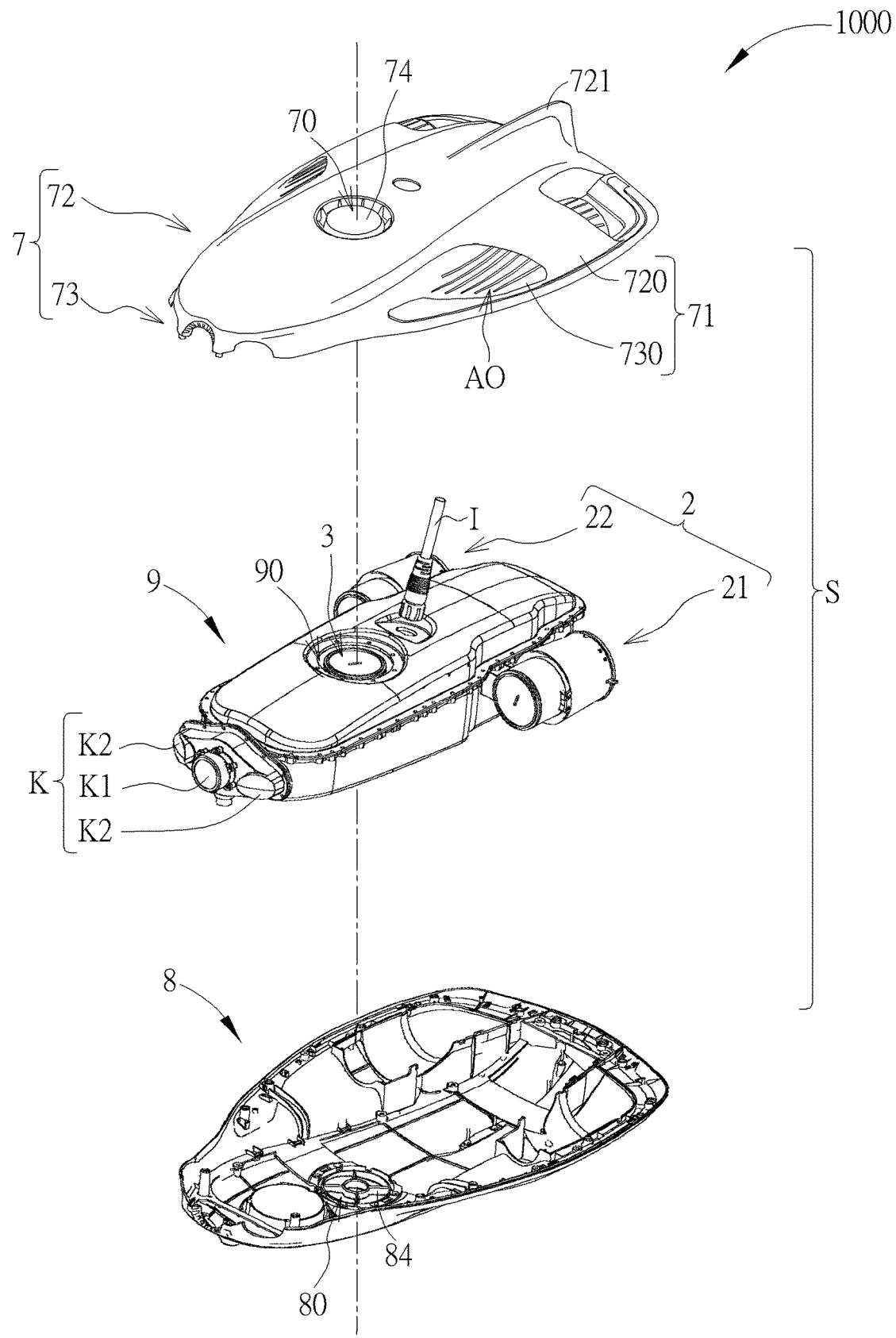
FIG. 3 is an exploded diagram of the underwater drone according to the first embodiment of the present invention.
Figure 4:
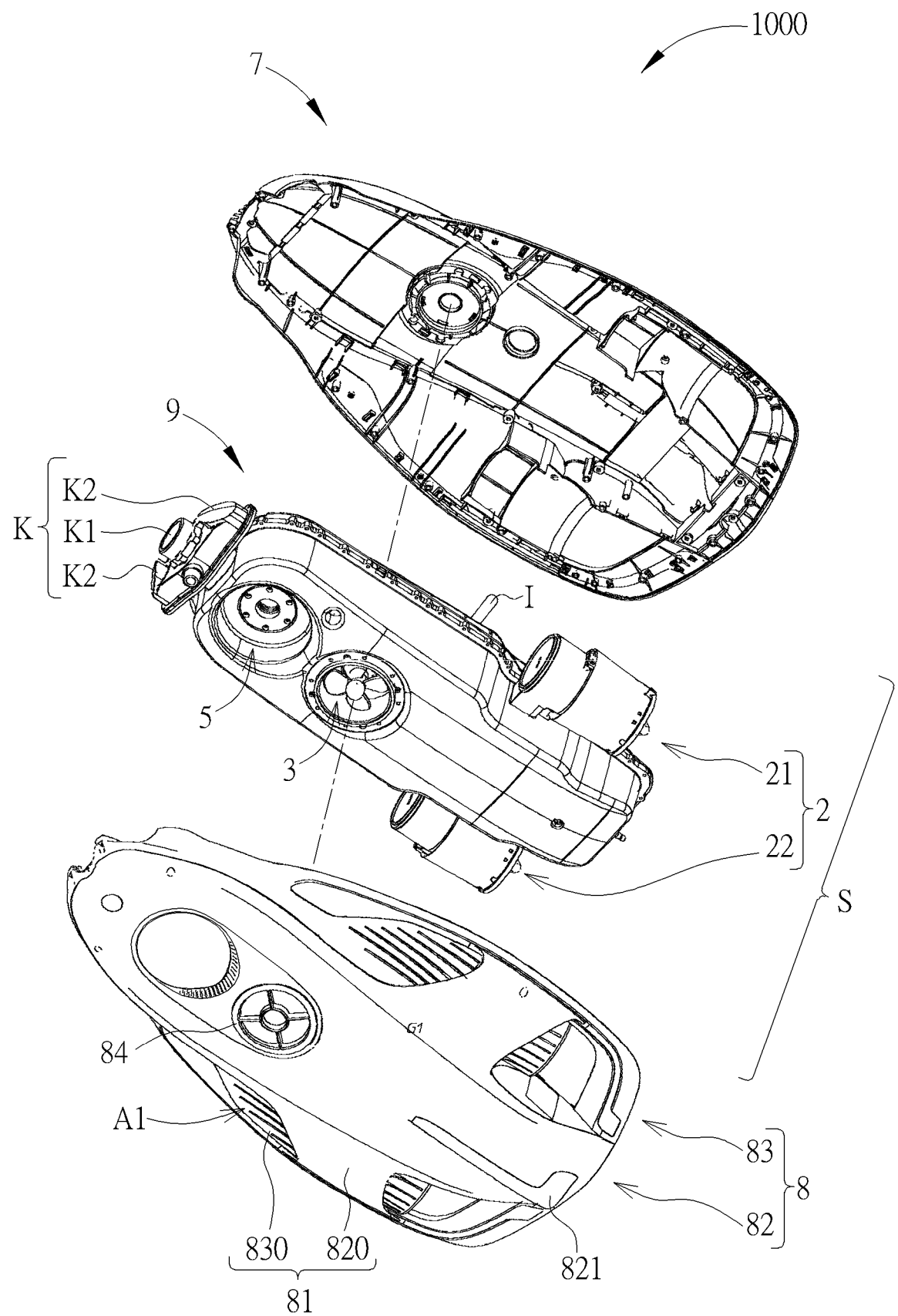
FIG. 4 is an exploded diagram of the underwater drone in another view according to the first embodiment of the present invention.

Please refer to FIG. 1 to FIG. 4. FIG. 1 is a diagram of an underwater drone 1000 according to a first embodiment of the present invention. FIG. 2 is a diagram of the underwater drone 1000 in another view according to the first embodiment of the present invention. FIG. 3 is an exploded diagram of the underwater drone 1000 according to the first embodiment of the present invention. FIG. 4 is an exploded diagram of the underwater drone 1000 in another view according to the first embodiment of the present invention. As shown in FIG. 1 to FIG. 4, the underwater drone 1000 includes a drone body 1, a horizontal propeller module 2 and a vertical propeller module 3. The drone body 1 has a longitudinal axis X, and the drone body 1 is arranged along the longitudinal axis X. In other words, the drone body 1 has a symmetric axis (i.e., the longitudinal axis X), and a right-half portion of the drone body 1 and a left-half portion of the drone body 1 are symmetric to each other relative to the longitudinal axis X.

Furthermore, the horizontal propeller module 2 is disposed on the drone body 1 and oriented substantially parallel to the longitudinal axis X. When the underwater drone 1000 is put underwater, the horizontal propeller module 2 is for driving the drone body 1 to move along the longitudinal axis X. In other words, the horizontal propeller module 2 is for driving the drone body 1 to move forwards (i.e., in a forward direction X1 along the longitudinal axis X) or backwards (i.e., in a backward direction X2 along the longitudinal axis X), and the longitudinal axis X of the drone body 1 is analogy for a roll axis of an airplane. In addition, the drone body 1 has a drone front end 10 and a drone rear end 11, and the longitudinal axis X passes through the drone front end 10 and the drone rear end 11.

Alternatively, the horizontal propeller module 2 is for driving to rotate about a vertical axis Y perpendicular to the longitudinal axis X. In this embodiment, an amount of the horizontal propeller module 2 is two, i.e., the horizontal propeller module 2 can include a left horizontal propeller module 21 and a right horizontal propeller module 22, and the left horizontal propeller module 21 is identical to the right propeller module 22. In practical application, the underwater drone 1000 has a central processing unit (details of the central processing unit is introduced later), which is coupled to the left horizontal propeller module 21 and the right horizontal propeller module 22 of the horizontal propeller module 2. The central processing unit is able to control the left horizontal propeller module 21 to work in a first power and control the right horizontal propeller module 22 to work in a second power different from the first power, which results in rotation of the drone body 1 about the vertical axis Y perpendicular to the longitudinal axis X. The vertical axis Y is analogy for a yaw axis of the airplane.

Figure 5:
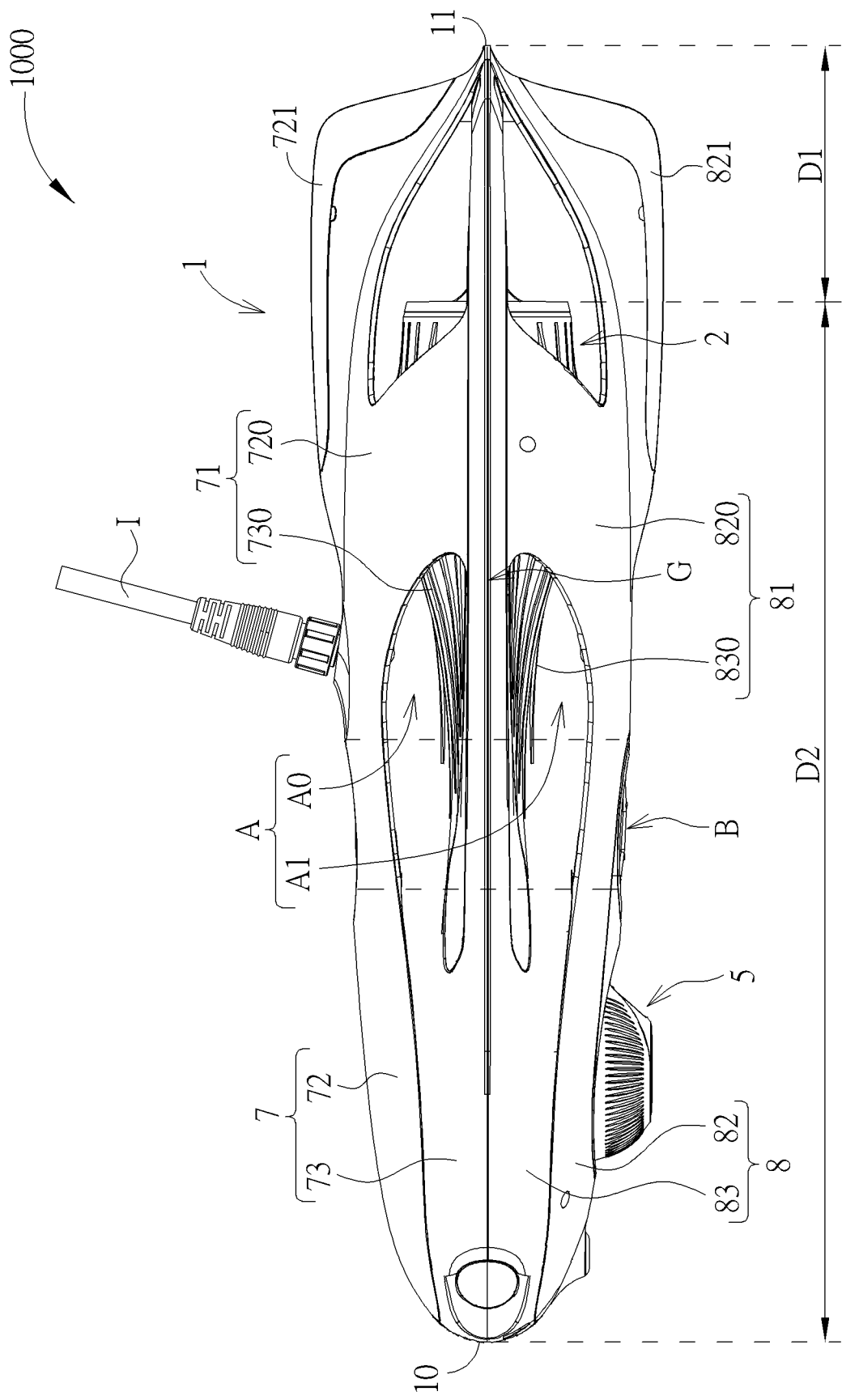
FIG. 5 is a side view of the underwater drone according to the first embodiment of the present invention.

Furthermore, the vertical propeller module 3 disposed on the drone body 1 and oriented substantially parallel to the vertical axis Y. The vertical propeller module 3 is for driving the drone body to rotate about a lateral axis Z perpendicular to the longitudinal axis X and the vertical axis Y. The lateral axis Z is analogy for a pitch axis of the airplane. Please refer to FIG. 5. FIG. 5 is a side view of the underwater drone 1000 according to the first embodiment of the present invention. As shown in FIG. 5, a distance D1 between the horizontal propeller module 2 and the drone rear end 11 is smaller than a distance D2 between the horizontal propeller module 2 and the drone front end 10. The vertical propeller module 3 is disposed between the drone front end 10 and a gravity center G of the underwater drone 1000 along the longitudinal axis X. In other words, the vertical propeller module 3 is disposed closer to the drone front end 10 than the drone rear end 11. The disposal of the vertical propeller module 3 between the drone front end 10 and the gravity center G of the underwater drone 1000 leads the drone front end 10 to move upwardly or downwardly in advance. As a result, setting the vertical propeller module 3 between the drone front end 10 and the gravity center G of the underwater drone 1000 helps the underwater drone 1000 to perform upward movement and downward movement.

Figure 6:
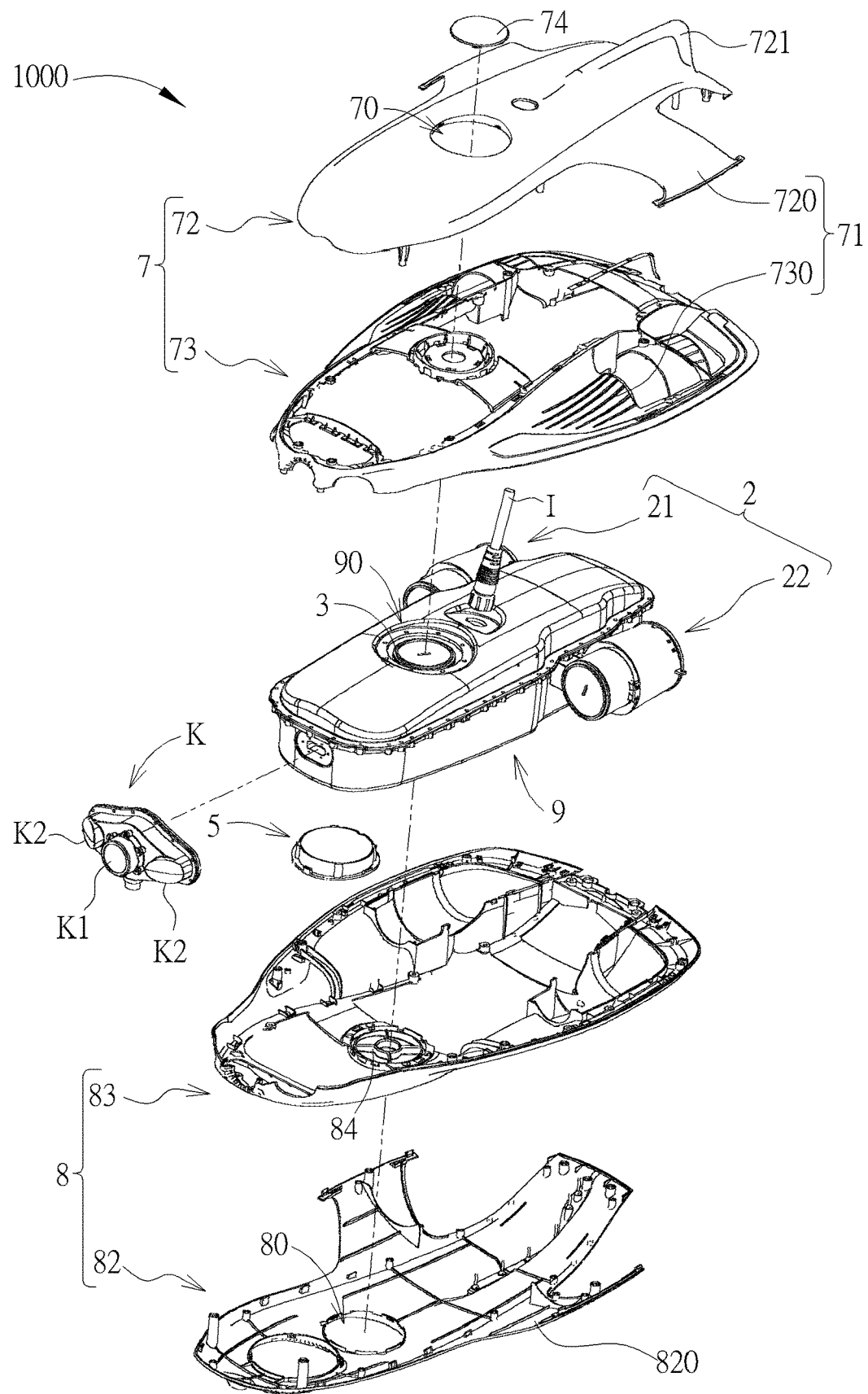
FIG. 6 is a further exploded diagram of the underwater drone according to the first embodiment of the present invention.
Figure 7:
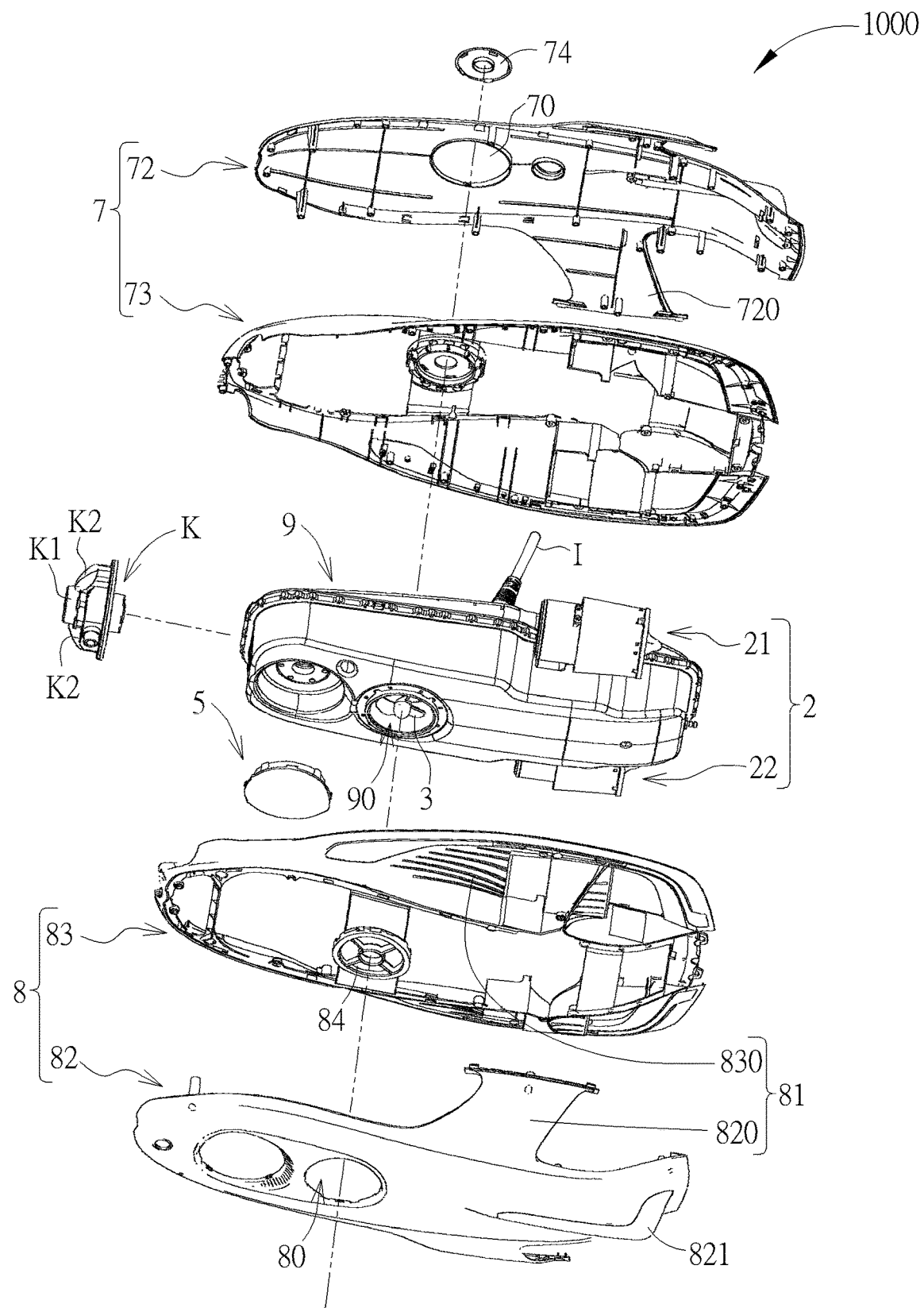
FIG. 7 is a further exploded diagram of the underwater drone in another view according to the first embodiment of the present invention.

Please refer to FIG. 6 and FIG. 7. FIG. 6 is a further exploded diagram of the underwater drone 1000 according to the first embodiment of the present invention. FIG. 7 is a further exploded diagram of the underwater drone 1000 in another view according to the first embodiment of the present invention. As shown in FIG. 6 and FIG. 7, the drone body 1 includes an upper casing assembly 7, a lower casing assembly 8 and a drone kernel 9. The lower casing assembly 8 is coupled with the upper casing assembly 7, and an accommodating space S is formed between the upper casing assembly 7 and the lower casing assembly 8. The drone kernel 9 is installed in the accommodating space S. In this embodiment, the horizontal propeller module 2 is installed on the drone kernel 9, and the vertical propeller module 3 is installed on the drone kernel 9.

Furthermore, a side portion 71 of the upper casing assembly 7, a side portion 81 of the lower casing assembly 8 and the horizontal propeller module 2 cooperatively form a horizontal channel A, and the horizontal channel A allows liquids to pass through. An upper opening 70 is formed on the upper casing assembly 7, a lower opening 80 is formed on the lower casing assembly 8, and a kernel channel 90 is formed on the drone kernel 9. The vertical propeller module 3 is installed inside the kernel channel 90. The upper opening 70, the lower opening 80 and the kernel channel 90 cooperatively form a vertical channel B, and the vertical channel B allows the liquids to pass through.

Furthermore, the upper casing assembly 7 includes a top housing 72 and an upper lateral housing 73. The top housing 72 has a top channel structure 720 located in a position corresponding to the horizontal propeller module 2, and an upper portion of the horizontal channel A is surrounded by the top channel structure 720. The upper lateral housing 73 is for installing the top housing 72 with the drone kernel 9. The upper lateral housing 73 has an upper liquid guiding portion 730, and the upper liquid guiding portion 730 is connected to a propeller frond end 20 of the horizontal propeller module 2 and for guiding the liquids to the upper portion of the horizontal channel A.

Furthermore, the lower casing assembly 8 includes a bottom housing 82 and a lower lateral housing 83. The bottom housing 82 has a bottom channel structure 820 located in a position corresponding to the horizontal propeller module 2 and the top channel structure 720. A lower portion of the horizontal channel A is surrounded by the bottom channel structure 820. The lower lateral housing 83 is for installing the bottom housing 82 with the drone kernel 9. The lower lateral housing 83 has a lower liquid guiding portion 830 corresponding to the upper liquid guiding portion 730. The lower liquid guiding portion 830 is connected to the propeller frond end 20 of the horizontal propeller module 2 and for guiding the liquids to the lower portion of the horizontal channel A.

In summary, the underwater drone 1000 of the present invention has the horizontal channel A and the vertical channel B. Therefore, when the drone body 1 is driven to move along the longitudinal axis X, i.e., when the drone body 1 is driven to move forwards or backwards, part of the liquids passes through the horizontal channel A, which reduces resistance of liquid and facilitates movement of the underwater drone 1000 along the longitudinal axis X. On the other hand, when the drone body 1 is driven to move along the vertical axis Y, i.e., when the drone body 1 is driven to move upwards or downwards, part of the liquids passes through the vertical channel B, which reduces resistance of liquid and facilitates movement of the underwater drone 1000 along the vertical axis Y. In such a manner, the underwater drone 1000 of the present invention enables rapidly underwater movement.

It should be noticed that the top housing 72 has a top stabilizer structure 721 and the bottom housing 82 has a bottom stabilizer structure 821. The top stabilizer structure 721 and the bottom stabilizer structure 821 respectively has a shape that reduces drag when the underwater drone 1000 moves through water, so as to stabilize the drone body 1 of the underwater drone 1000. Furthermore, a density of the underwater drone 1000 is designed to be substantially identical to a density of water, which facilitates the underwater drone 1000 to dive into the water, i.e., the downward direction along the vertical axis Y. In this embodiment, a leak hole S1 is formed on at least one of the top housing 72 and the bottom housing 82. Furthermore, the leak hole S1 is for discharging air inside the accommodating space S, which facilitates to reduce buoyancy of the underwater drone 1000. In such a manner, it helps the underwater drone 1000 to dive into the water.

In this embodiment, the upper casing assembly 7 further includes an upper filter structure 74, and the lower casing assembly 8 further includes a lower filter structure 84. The upper filter structure 74 is disposed in the upper opening 70 and for filtering an object, such as water plants and so on, from entering the kernel channel 90 via the upper opening 70. The lower filter structure 84 is disposed in the lower opening 80 and for filtering the object from entering the kernel channel 90 via the lower opening 80. As a result, the upper filter structure 74 and the lower filter structure 84 cooperatively prevent the object from damaging the vertical propeller module 3 via the kernel channel 90.

Figure 8:
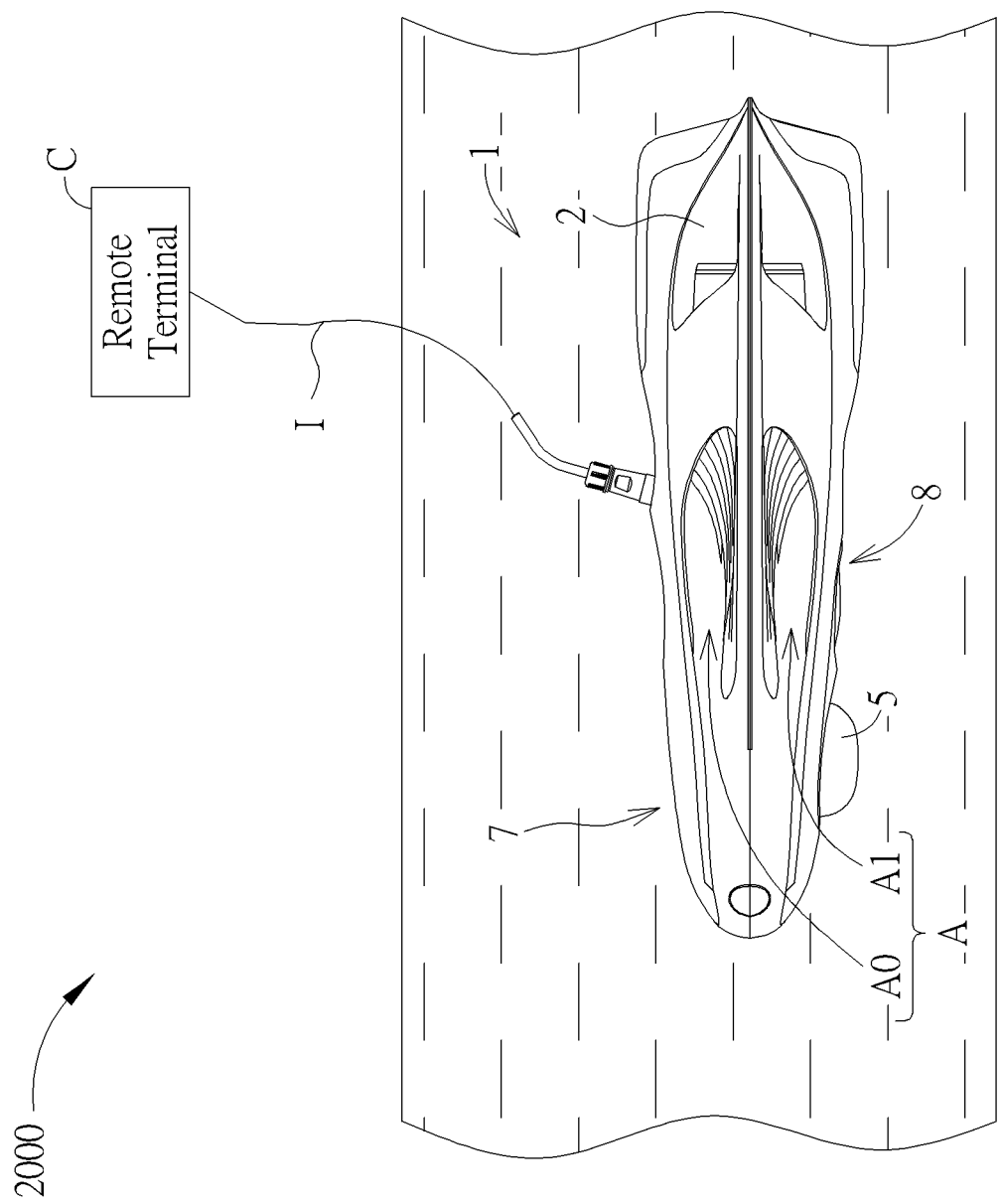
FIG. 8 is a diagram illustrating the underwater drone in an operating status according to the first embodiment of the present invention.
Figure 9:
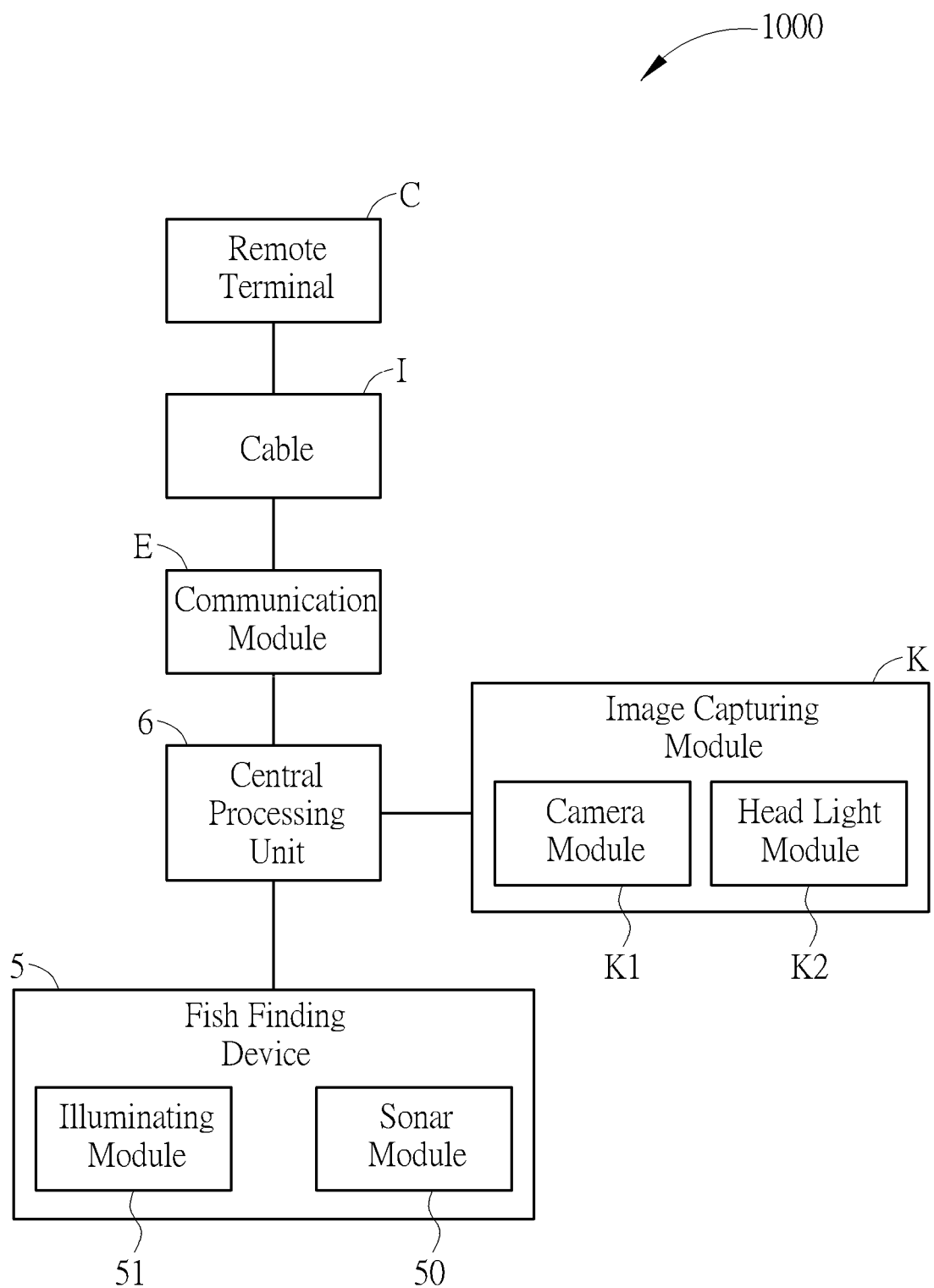
FIG. 9 is a functional block diagram illustrating the underwater drone in the operating status according to the first embodiment of the present invention.

Please refer to FIG. 1, FIG. 2, FIG. 8 and FIG. 9. FIG. 8 is a diagram illustrating the underwater drone 1000 in an operating status according to the first embodiment of the present invention. FIG. 9 is a functional block diagram illustrating the underwater drone 1000 in the operating status according to the first embodiment of the present invention. As shown in FIG. 1, FIG. 2, FIG. 8 and FIG. 9, the underwater drone 1000 further includes an image capturing module K, a fish finding device 5, a communication module E and a central processing unit 6. The image capturing module K is disposed on the drone body 1 and for capturing images or recording videos. The fish finding device 5 is installed on the drone body 1 and for finding the location at which the fish are. The fish finding device 5 includes a sonar module 50 and a fish attracting module 51. The sonar module 50 is for emitting sound waves and for receiving the reflected sound waves, so that the sonar module 50 is able to obtain whether there is the fish and a distance in between the fish and the drone body 1. The fish attracting module 51 is coupled with the sonar module 50. In this embodiment, the fish attracting module 51 can be an illuminating module, e.g., the fish attracting module 51 can be equipped with Light Emitting Diode (LED) for emitting light. Since the fish has phototropism, the fish tends to be attracted by the light which is emitted from the fish attracting module 51 (i.e., the illuminating module), so that the fish attracting module 51 is used for illuminating for attracting the fish.

It should be noticed that designs of the fish attracting module 51 of the present invention is not limited to those mentioned above. For example, the fish attracting module 51 can include a simulated bait, such as a top water bait, a plug, a jerk bait, a crank bait and so on. In addition, the simulated bait can be designed to distribute flavor or produce sound, so as to enhance fish attracting effect of the fish attracting module 51.

Furthermore, the communication module E is coupled with the drone body 1 and for establishing communication with the remote terminal C, and the central processing unit 6 is coupled with the image capturing module K, the fish finding device 5 and the communication module E. The central processing unit 6 is for controlling the image capturing module K and the fish finding device 5 according to the communication between the communication module E and the remote terminal C. In such a manner, a user is able to control the underwater drone 1000 by utilizing the remote terminal C to establishing the communication with the communication module E of the underwater drone 1000, so that the user is able to control the fish finding device 5 to find the location at which the fish are, control the underwater drone 1000 to proceed to the location at which the fish are, and further control the image capturing module K to capture photos or recording videos of the fish, which enhances interests of use of the underwater drone 1000.

In this embodiment, the underwater drone 1000 can further include a cable I. The cable I connects the drone body 1 with the remote terminal C, and the remote terminal C is coupled with the communication module E and the central processing unit 6 via the cable I. In other words, the remote terminal C is coupled with the communication module E and the central processing unit 6 in a wired manner, but the connecting manner between the remote terminal C and the underwater drone 1000 of the present invention is not limited thereto.

Figure 10:
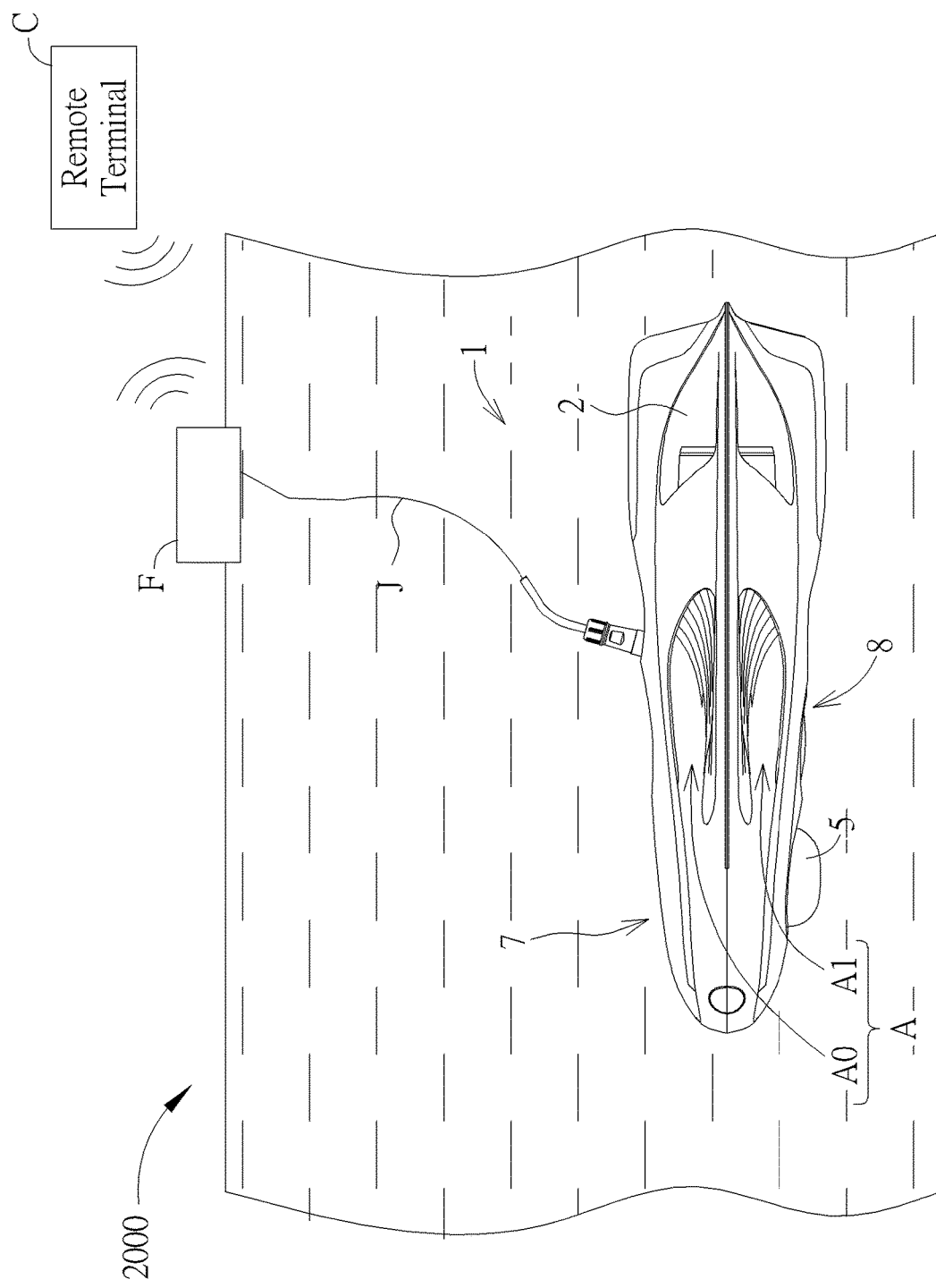
FIG. 10 is a diagram illustrating an underwater drone in an operating status according to a second embodiment of the present invention.
Figure 11:
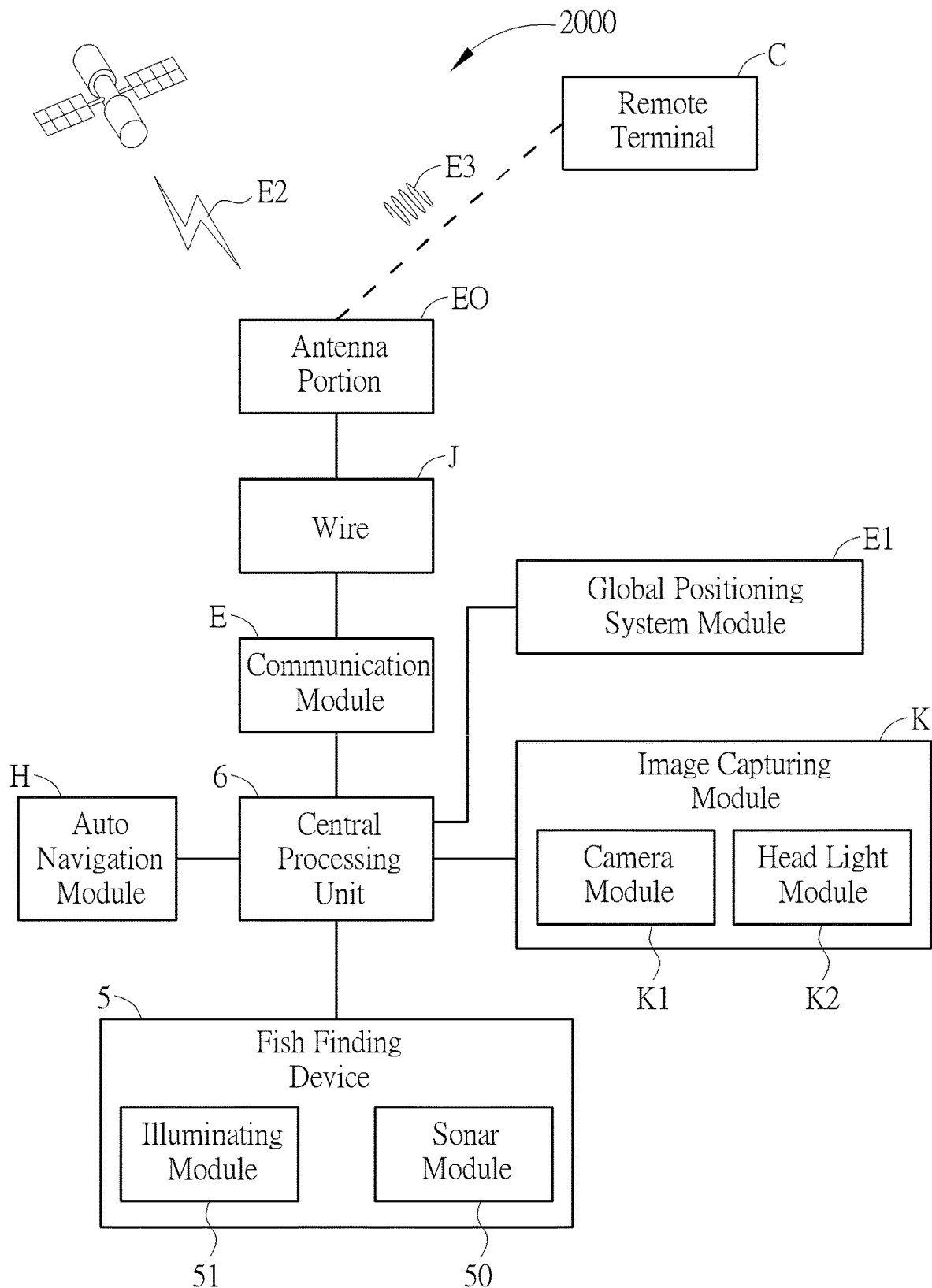
FIG. 11 is a functional block diagram illustrating the underwater drone in the operating status according to the second embodiment of the present invention.

Please refer to FIG. 10 and FIG. 11. FIG. 10 is a diagram illustrating an underwater drone 2000 in an operating status according to a second embodiment of the present invention. FIG. 11 is a functional block diagram illustrating the underwater drone 2000 in the operating status according to the second embodiment of the present invention. As shown in FIG. 10 and FIG. 11, the major difference between the underwater drone 2000 and the aforesaid underwater drone 1000 is that the communication module E of the underwater drone 2000 includes an antenna module E0. The antenna module E0 is used for establishing the communication between the communication module E and the remote terminal C. In other words, in this embodiment, the remote terminal C is coupled with the communication module E and the central processing unit 6 in a wireless manner.

Furthermore, the underwater drone 2000 further includes a buoy member F and a wire J. The buoy member F is separate from the drone body 1 and for being floated on a surface of water, and the antenna module E0 is disposed in the buoy member F. The wire J connects the buoy member F with the drone body 1, and the antenna module E0 is coupled to the central processing unit 6 via the wire J. In such a manner, the antenna module E0 floats on the surface of the water with the buoy member F, which facilitates the communication between the antenna module E0 and the remote terminal C without decaying of transmitting of signals between the communication module E and the remote terminal C due to resistance of the water.

It should be noticed that designs of the buoy member F of the present invention is not limited to those mentioned above, i.e., the buoy member F is not limited be floated on the surface of water. For example, the buoy member F can be placed on an object, such as a tree, on a shore of the water, or alternatively, the buoy member F can be placed on a boat on which the user is. In other words, designs that the buoy member F is separate from the drone body 1 and is able to be separate from the water as the buoy member F is in use are within the scope of the present invention.

As shown in FIG. 10 and FIG. 11, the communication module E includes a global positioning system (GPS) module E1. The GPS module E1 is disposed in the buoy member F and coupled to the central processing unit 6. Since the GPS module E1 is disposed in the buoy member F, the GPS module E1 is able to float on the surface of the water with the buoy member F, so that the GPS module is able to receive a satellite signal E2 from a satellite and transmit the satellite signal E2 to the communication module E and the central processing unit 6 for positioning the underwater drone 2000. When the underwater drone 1000 is positioned, the communication module E and the central processing unit 6 are able to send a position message E3 of the underwater drone 2000 to the remote terminal C via the communication in between the remote terminal C and the antenna module E0. In other words, the GPS module E1 is for receive the satellite signal E2 for the positioning of the underwater drone 2000 due to the disposal of the GPS module E1 with the buoy member F, and further for sending the position message E3 of the underwater drone 2000 to the remote terminal C. In this embodiment, the communication module E is a wireless digital data link (DDL) module, which is able to transmit image data and digit data via a single wireless connection.

In this embodiment, the underwater drone 2000 can further include an auto navigating module H. When the central processing unit 6 receives the position message E3 of underwater drone 2000 via the global positioning system (GPS) module E1, the user is able to set up a predetermined destination message via connection between the remote terminal C and an internet. Furthermore, the user is further able to send the destination message to the central processing unit 6. When the central processing unit 6 receives the destination message from the remote terminal C, the auto navigating module H and the central processing unit 6 cooperatively control the horizontal propeller module 2 and the vertical propeller module 3 to drive the drone body 1 to a destination defined by the destination message according to the satellite signal E2 received by the GPS module E1. Components with denoted in this embodiment identical to those in the aforesaid embodiment have identical structures and functions, and further description is omitted herein for simplicity.

Figure 12:
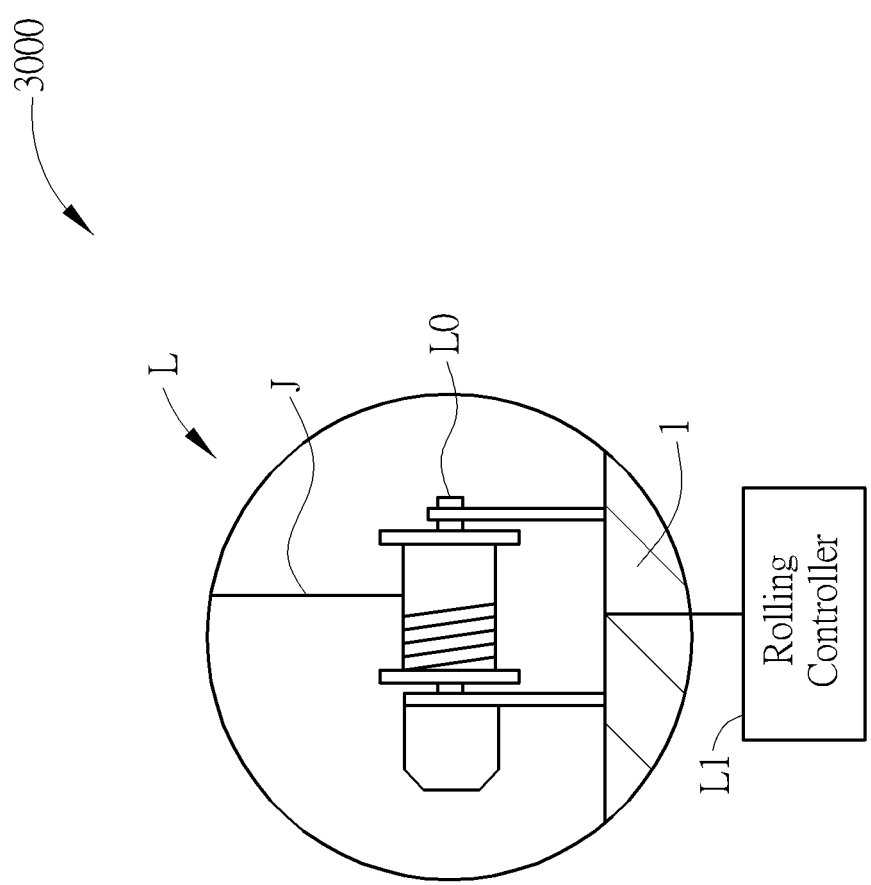
FIG. 12 is a diagram of an underwater drone according to a third embodiment of the present invention.

Please refer to FIG. 12. FIG. 12 is a diagram of an underwater drone 3000 according to a third embodiment of the present invention. As shown in FIG. 12, the major difference between the underwater drone 3000 and the aforesaid underwater drone 2000 is that the underwater drone 3000 further includes a wire rolling module L. The wire rolling module L is installed on the drone body 1, and the wire rolling module L is for rewinding or releasing the wire J. In this embodiment, the wire rolling module L includes a rolling device L0 and a rolling controller L1. The rolling device L0 is disposed on the drone body 1 and protrudes from a surface of the drone body 1. The rolling controller L1 is coupled to the rolling device L0 and the central processing unit 6. The rolling controller L1 is controlled by the central processing unit 6, so as to drive the rolling device L0 to rewind or release the wire J.

In this embodiment, the underwater drone 3000 can further include a depth sensor for sensing a depth in which the underwater drone 3000 dives into the water. Accordingly, the central processing unit 6 of the underwater drone 3000 is able to control the rolling controller L1 to drive the rolling device L0 to rewind or release the wire J. For example, when the underwater drone 3000 is controlled by the remote terminal C to dive deeper, i.e., when the distance between the underwater drone 3000 and the surface of the water increases, the central processing unit 6 of the underwater drone 3000 controls the rolling controller L1 to drive the rolling device L0 to release the wire J. On the other hand, when the underwater drone 3000 is controlled by the remote terminal C to lift, i.e., when the distance between the underwater drone 3000 and the surface of the water decreases, the central processing unit 6 of the underwater drone 3000 controls the rolling controller L1 to drive the rolling device L0 to rewind the wire J. As a result, a length of the wire J varies with the distance between the surface of the water and the underwater drone 3000, so as to keep the wire J in a proper length for avoiding the redundant length of the wire J from entangling by objects, such as water plants and so on. Components with denoted in this embodiment identical to those in the aforesaid embodiment have identical structures and functions, and further description is omitted herein for simplicity.

Figure 13:
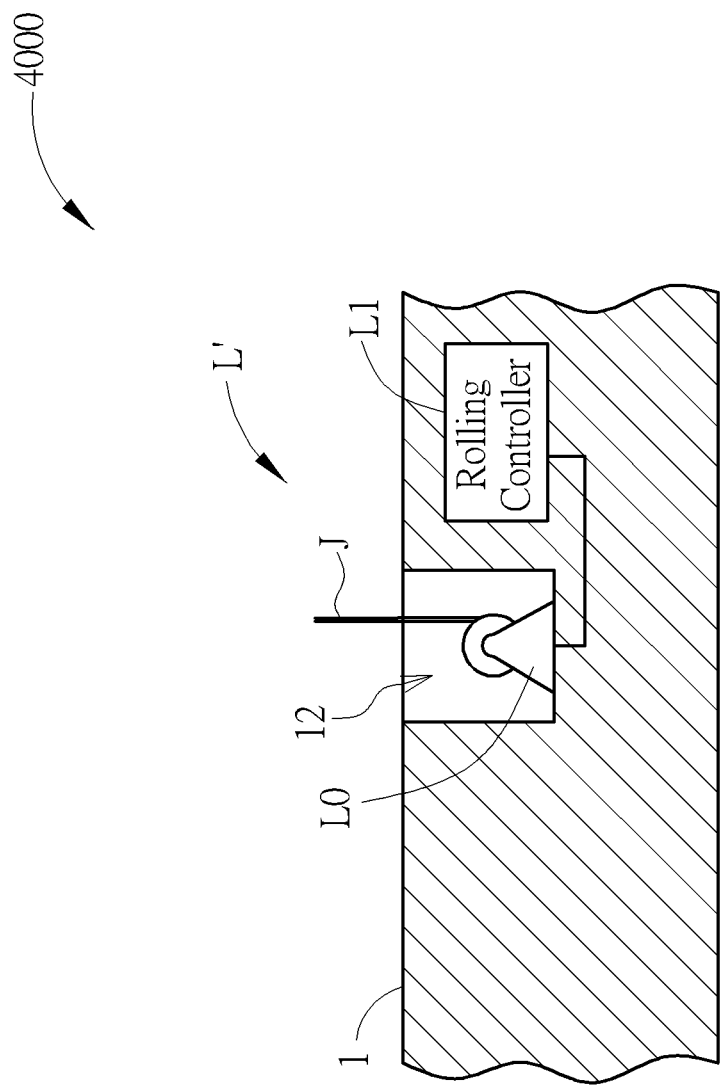
FIG. 13 is a diagram of an underwater drone according to a fourth embodiment of the present invention.

Please refer to FIG. 13. FIG. 13 is a diagram of an underwater drone 4000 according to a fourth embodiment of the present invention. As shown in FIG. 13, the major difference between the underwater drone 4000 and the aforesaid underwater drone 3000 is that there is a cavity 12 formed on the drone body 1 of the underwater drone 4000, and the rolling device L0 of the wire rolling module L is disposed inside the cavity 12 instead of protruding from the surface of the drone body 1, which avoids the rolling device L0 from damage due to collision of the rolling device L0 with the objects, such as water plants and so on. Components with denoted in this embodiment identical to those in the aforesaid embodiment have identical structures and functions, and further description is omitted herein for simplicity.

Figure 14:
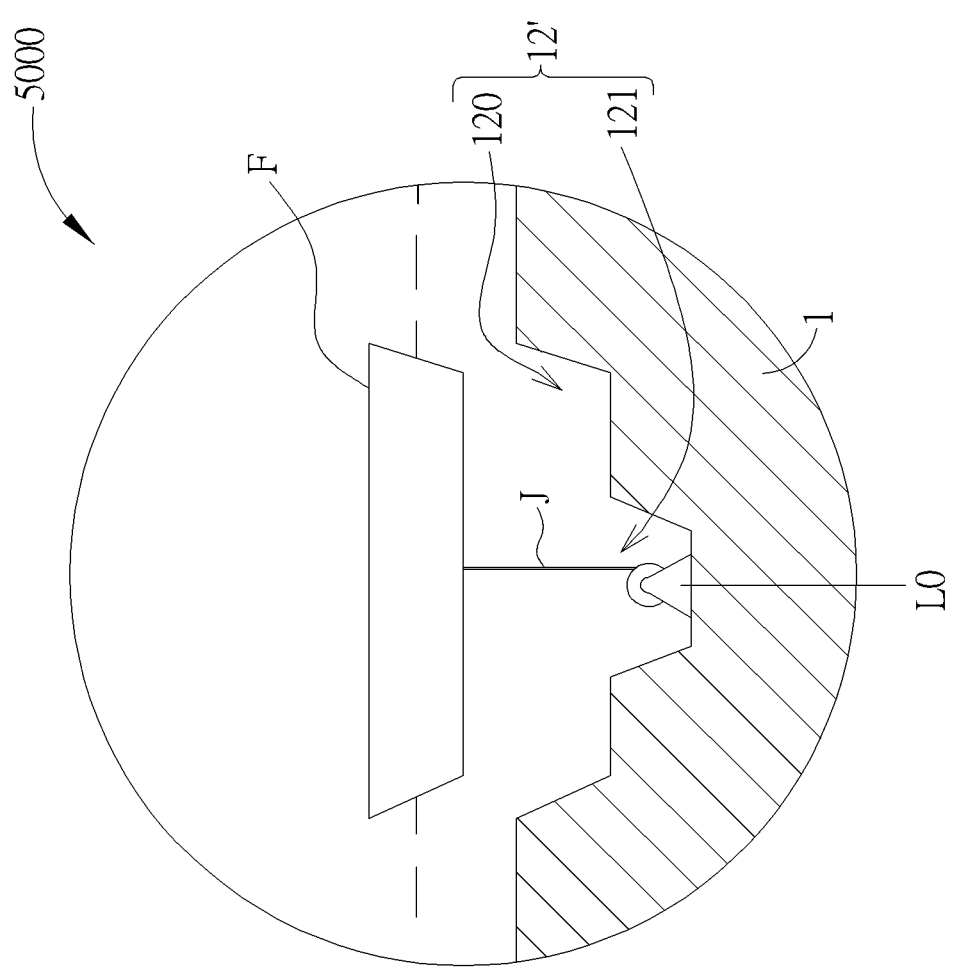
FIG. 14 is a diagram of an underwater drone according to a fifth embodiment of the present invention.

Please refer to FIG. 14. FIG. 14 is a diagram of an underwater drone 5000 according to a fifth embodiment of the present invention. As shown in FIG. 14, the major difference between the underwater drone 5000 and the aforesaid underwater drone 4000 is that a cavity 12' of the underwater drone 5000 includes a first concave portion 120 and a second concave portion 121 communicating with the first concave portion 120. The rolling device L0 of the wire rolling module L of the underwater drone 5000 is disposed inside the second concave portion 121, and a shape of the first concave portion 120 corresponds to a shape of the buoy member F of the underwater drone 5000. As a result, when the rolling device L0 rewinds the wire J to retract the buoy member F onto the drone body 1, the buoy member F is able to fit in the first concave portion 120, so as to keep outfit of the drone body 1 when the buoy member F is retracted. Components with denoted in this embodiment identical to those in the aforesaid embodiment have identical structures and functions, and further description is omitted herein for simplicity.

It should be noticed that ways of the wire rolling module L to release or rewind the wire J is not limited to those illustrated in figures of this embodiment. For example, the wire rolling module L is able to release or rewind the wire in a manual manner, i.e., the wire rolling module L can include the rolling device L0 only without the rolling controller L1, so that the wire rolling module L (i.e., the rolling device L0) is operated by user directly. Ways of disposal of the rolling device L0 and the drone body 1 can adopt the designs of the underwater drone 5000 of the fifth embodiment. In other words, and the rolling device L0 (i.e., the wire rolling module L) is disposed in the second concave portion 121, and the first concave portion 120 is for containing the buoy member F when the buoy member F is retracted by the rolling device L0 according to the operation of the user.

The ways of disposal of the rolling device L0 and the drone body 1 is not limited to those mentioned above. For example, the rolling device L0 can be designed to be floated on the surface of water, and the wire J connects the rolling device L0 and the drone body 1. When the underwater drone equipped with the rolling device L0 in the aforesaid floating design is controlled to dive deeper, the underwater drone rolls the rolling device L0 floated on the surface of the water, so as to release the wire J. On the other hand, when the underwater drone equipped with the rolling device L0 in the aforesaid floating design is controlled to lift, the rolling device L0 is operated manually by the user to rewind the wire J.

Figure 15:
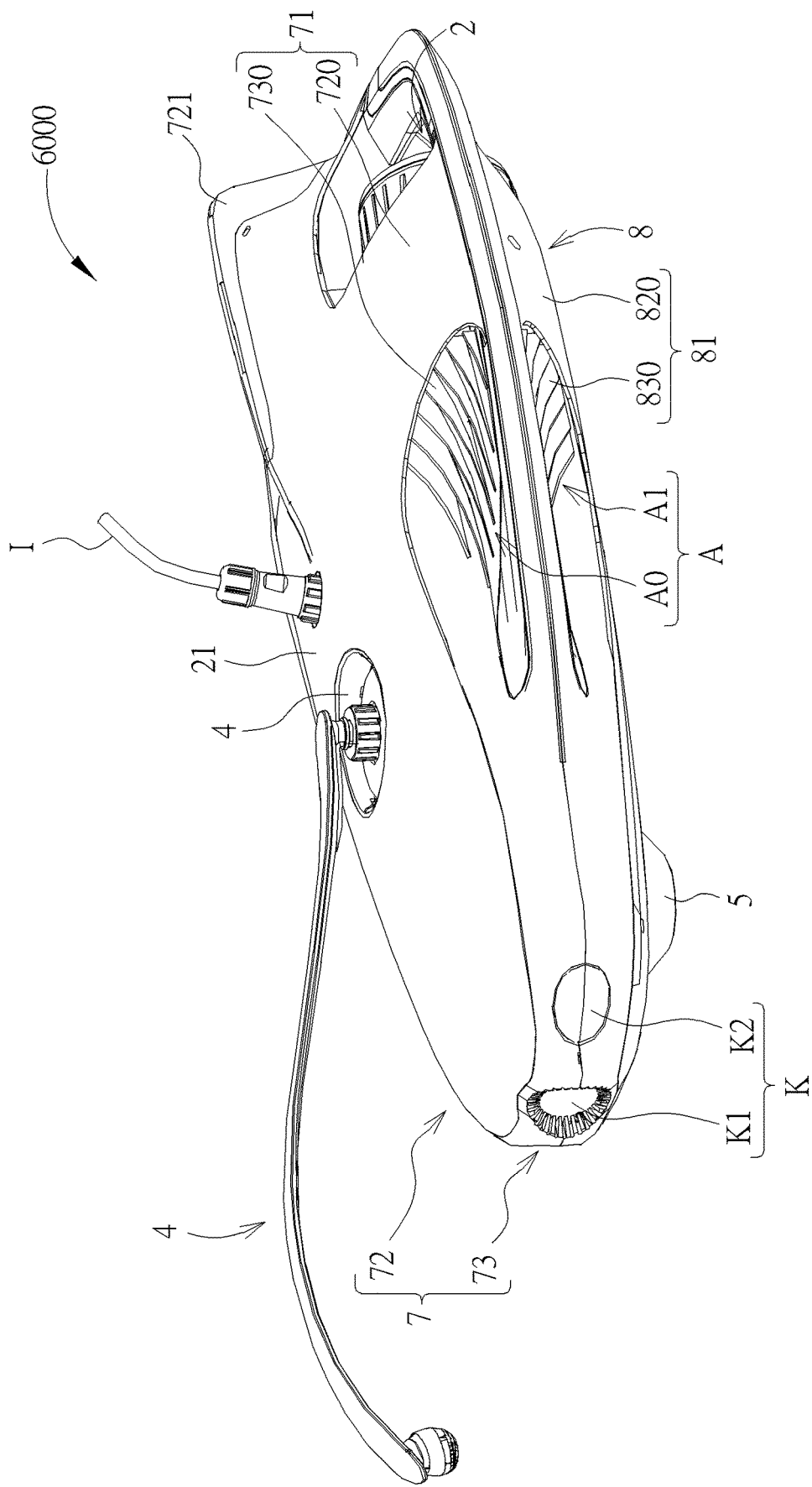
FIG. 15 is a diagram of an underwater drone according to a sixth embodiment of the present invention.

Please refer to FIG. 15. FIG. 15 is a diagram of an underwater drone 6000 according to a sixth embodiment of the present invention. As shown in FIG. 15, the major difference between the underwater drone 6000 and the aforesaid underwater drone 1000 is that the underwater drone 6000 further includes a fishing device 4. The fishing device 4 is disposed on the drone body. When the fish finding device 5 finds the location at which the fish are, the horizontal propeller module 2 and the vertical propeller module 3 cooperatively drive the drone body 1 to the location. In the meanwhile, the fishing device 4 is for fishing when the horizontal propeller module 2 and the vertical propeller module 3 cooperatively drive the drone body 1 to the location at which the fish are.

Figure 16:
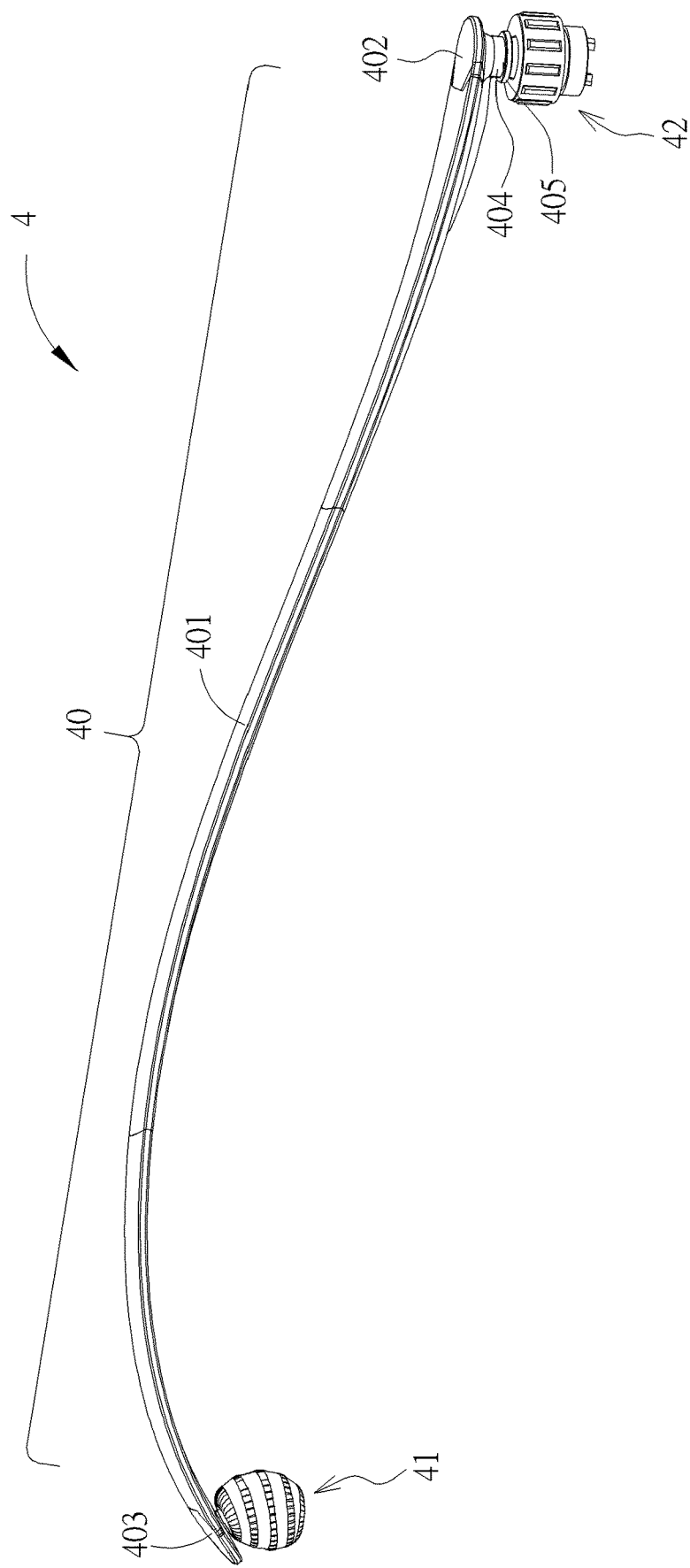
FIG. 16 is a diagram of a fishing device according to the sixth embodiment of the present invention.
Figure 17:
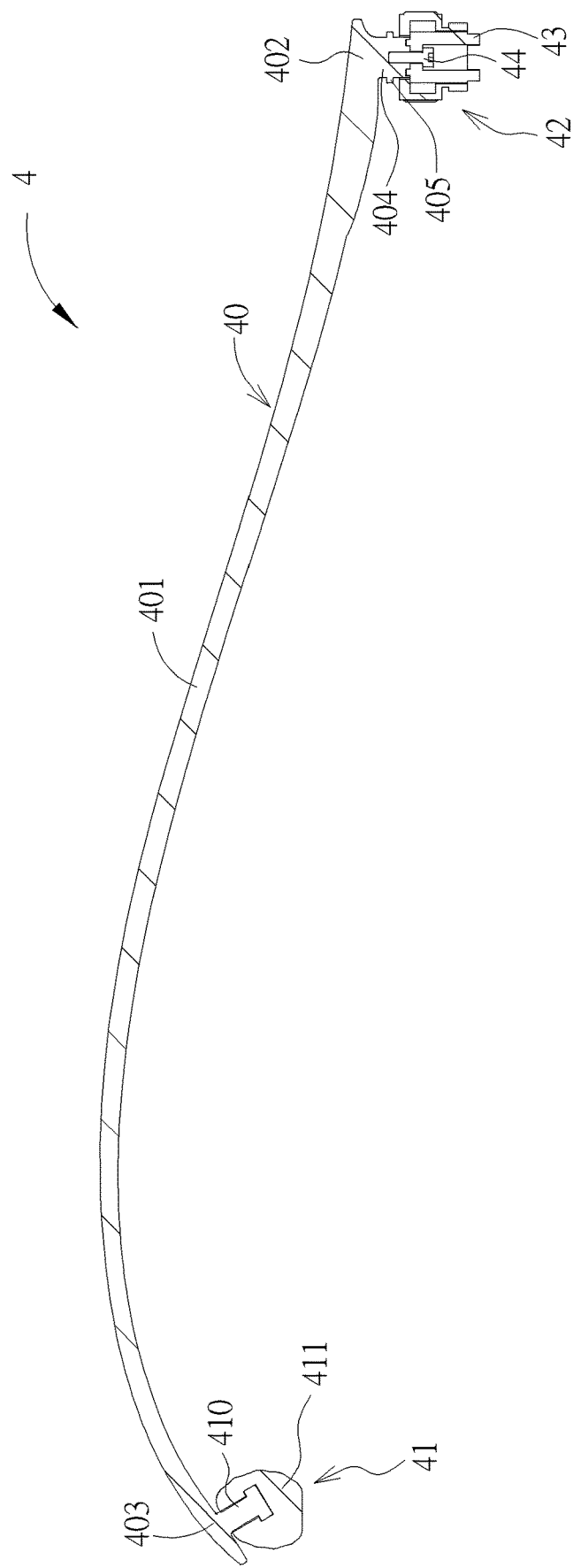
FIG. 17 is an exploded diagram of the fishing device according to the sixth embodiment of the present invention.
Figure 18:
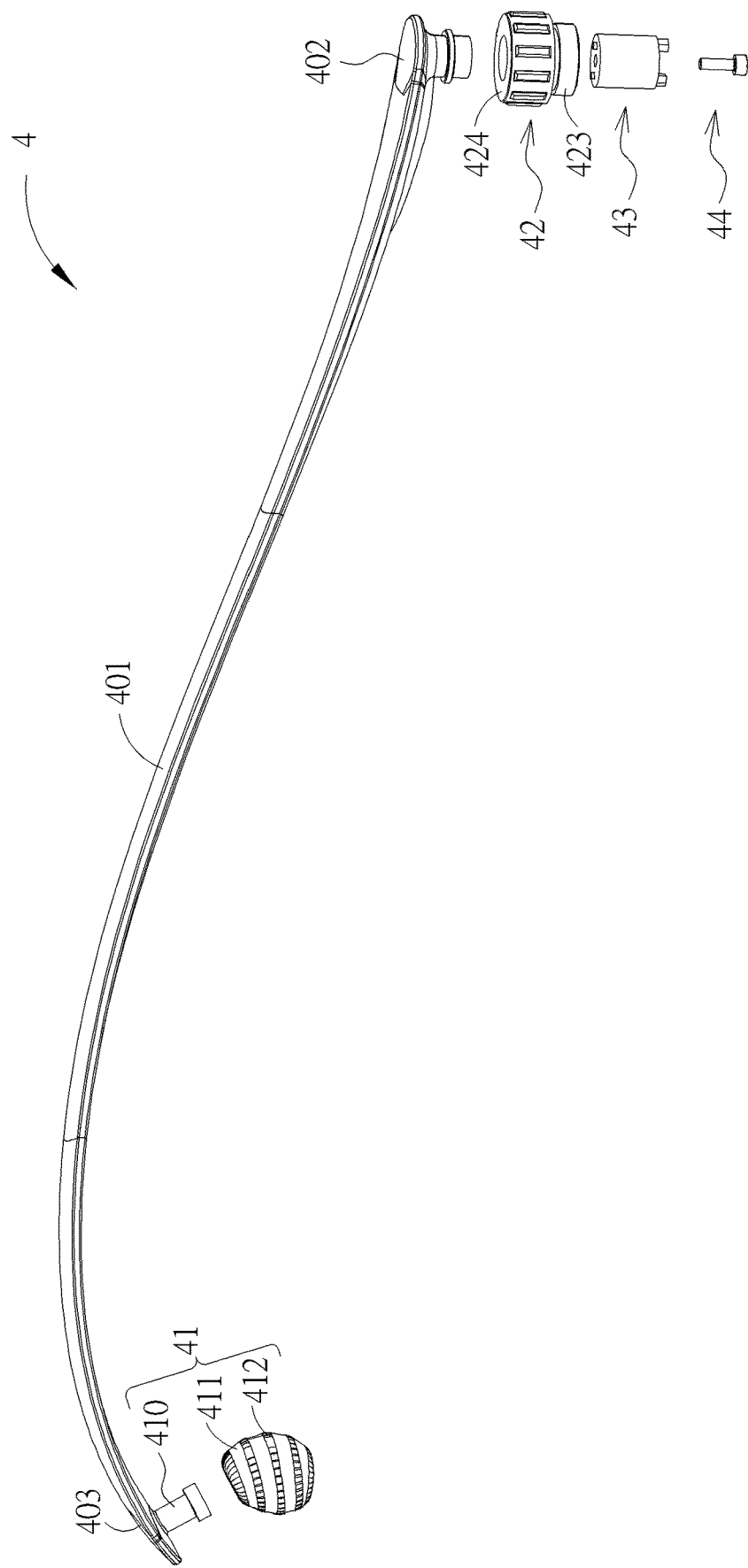
FIG. 18 is a sectional diagram of the fishing device according to the sixth embodiment of the present invention.
Figure 19:
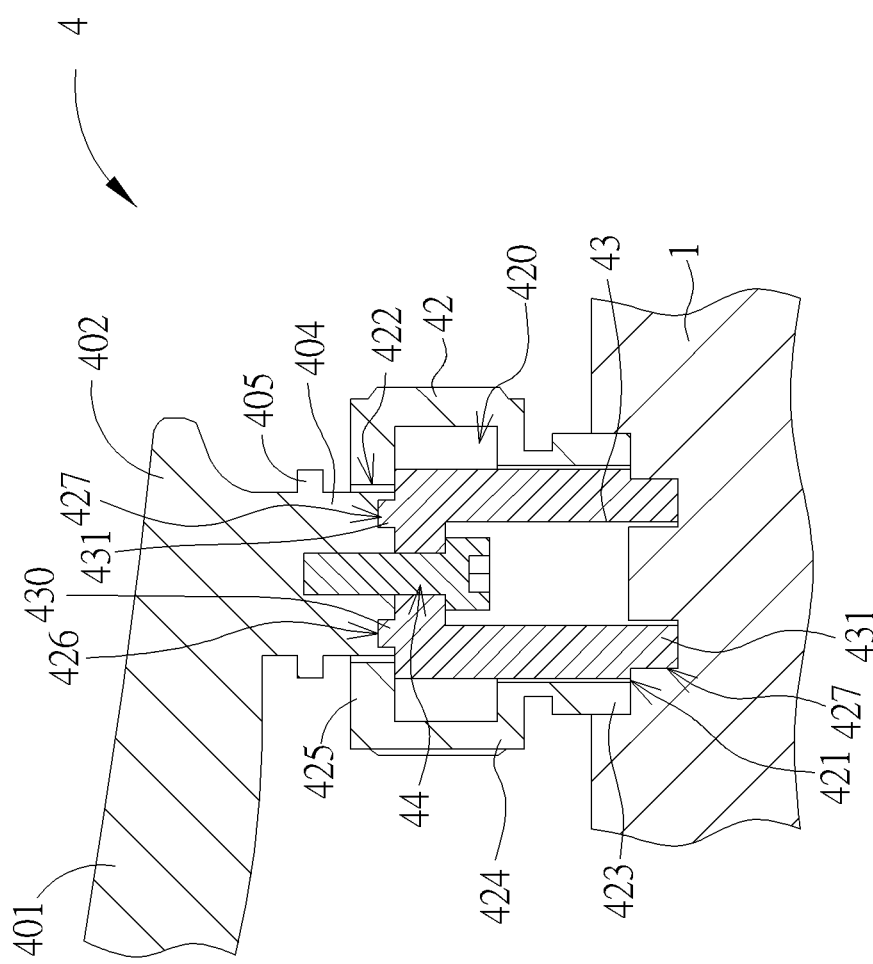
FIG. 19 is a partly sectional diagram of the fishing device according to the sixth embodiment of the present invention.

Please refer to FIG. 15 to FIG. 19. FIG. 16 is a diagram of the fishing device 4 according to the sixth embodiment of the present invention. FIG. 17 is an exploded diagram of the fishing device 4 according to the sixth embodiment of the present invention. FIG. 18 is a sectional diagram of the fishing device 4 according to the sixth embodiment of the present invention. FIG. 19 is a partly sectional diagram of the fishing device 4 according to the sixth embodiment of the present invention. As shown in FIG. 15 to FIG. 19, the fishing device 4 includes a fishing rod 40 and a fish catching member set 41. The fishing rod 40 has a rod body 401, a first connecting end 402 and a second connecting end 403 opposite to the first connecting end 402, and the first connecting end 402 is connected to the drone body 1. The fish catching member set 41 is connected to the second connecting end 403 and for catching the fish.

Furthermore, the fishing device 4 further includes a connecting member 42, a constraining member 43 and a fixing member 44. The connecting member 42 is fixed on the drone body 1. The constraining member 43 is disposed through the connecting member 42 and connected to the first connecting end 402. The fixing member 44 is for fixing the connecting member 42 and the constraining member 43. An inner space 420 with an opening 421 is formed in the connecting member 42, and a through hole 422 is formed on the connecting member 42 and communicates with the inner space 420. The constraining member 43 is disposed in the inner space 420 via the opening 421 for assembly with the connecting member 42.

Furthermore, the fishing rod 40 further has a protruding platform 404 protruding from the first connecting end 402. During assembly of the fishing rod 40, the connecting member 42 and the constraining member 43, the protruding platform 404 of the fishing rod 40 abuts against the constraining member 43 via the through hole 422, and then the fixing member 43 connects the protruding platform 404 and the constraining member 43. In this embodiment, the fixing member 43 is a screw component, i.e., the protruding platform 404 of the fishing rod 40 and the constraining member 43 are connected to each other in a screwed manner.

As shown in FIG. 15 to FIG. 19, the fishing rod 40 further has a protruding flange 405. The protruding flange 405 protrudes from a periphery of the protruding platform 404 and spaced from an end of the protruding platform 404 by a distance. Furthermore, the connecting member 42 includes a base portion 423 and a head portion 424. The base portion 423 is for fixing with the drone body 1. The head portion 424 is connected to the base portion 423. The head portion 424 has a top wall 425, wherein the through hole 422 is formed on the top wall 425. When the protruding platform 404 of the fishing rod 40 and the constraining member 43 are connected to each other in a screwed manner, the top wall 425 movably engages between the constraining member 43 and the protruding flange 405. In other words, since the protruding flange 405 is spaced from the end of the protruding platform 404 by the distance, it allows the top wall 425 of the connecting member 42 to be movably engaged between the protruding flange 405 and the constraining member 43 when the protruding platform 404 of the fishing rod 40 is connected to the constraining member 43 by the fixing member 44.

In this embodiment, the base portion 423 of the connecting member 42 can has a threaded structure. The threaded structure is used for screwing with the drone body 1, which results in fixing of the connecting member 42 and the drone body 1. In other words, during assembly the fishing device 4 and the drone body 1 of the underwater drone 6000, the connecting member 42 sheathes on the protruding platform 404 of the fishing rod 40 by the through hole 422, meanwhile, the protruding platform 404 is disposed through the connecting member 42 via the through hole 422, and the end of the protruding platform 404 abuts against the constraining member 43. Afterwards, the fixing member 44 is utilized for fixing the constraining member 43 with the protruding platform 404 of the fishing rod 40, which enables the top wall 425 of the connecting member 42 to be movably engaged between the protruding flange 405 of the fishing rod 40 and the constraining member 43. Finally, the base portion 423 is screwed onto the drone body 1 for secure the connecting member 42 and the drone body 1.

Figure 20:
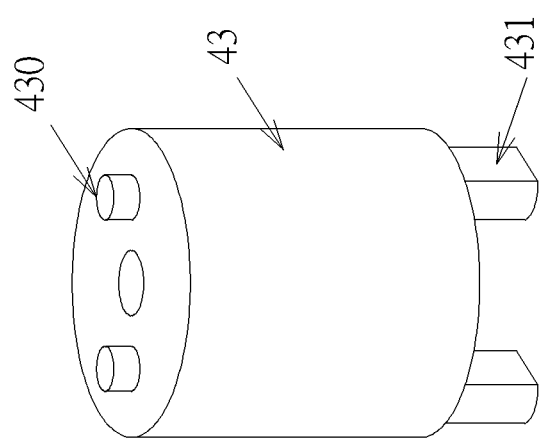
FIG. 20 is a diagram of a constraining member according to the six embodiment of the present invention.

Please refer to FIG. 19 and FIG. 20. FIG. 20 is a diagram of the constraining member 43 according to the six embodiment of the present invention. As shown in FIG. 19 and FIG. 20, a first constraining slot 406 is formed on the protruding platform 404, and a second constraining slot 407 is formed on the drone body 1. The constraining member 43 has a first constraining protrusion 430 and a second constraining protrusion 431. The first constraining protrusion 430 is used for engaging with the first constraining slot 406, so that the constraining member 43 is constrained from rotating relative to the fishing rod 40. The second constraining protrusion 431 is used for engaging with the second constraining slot 407, so that the constraining member 43 is constrained from rotating relative to the drone body 1.

Figure 21:
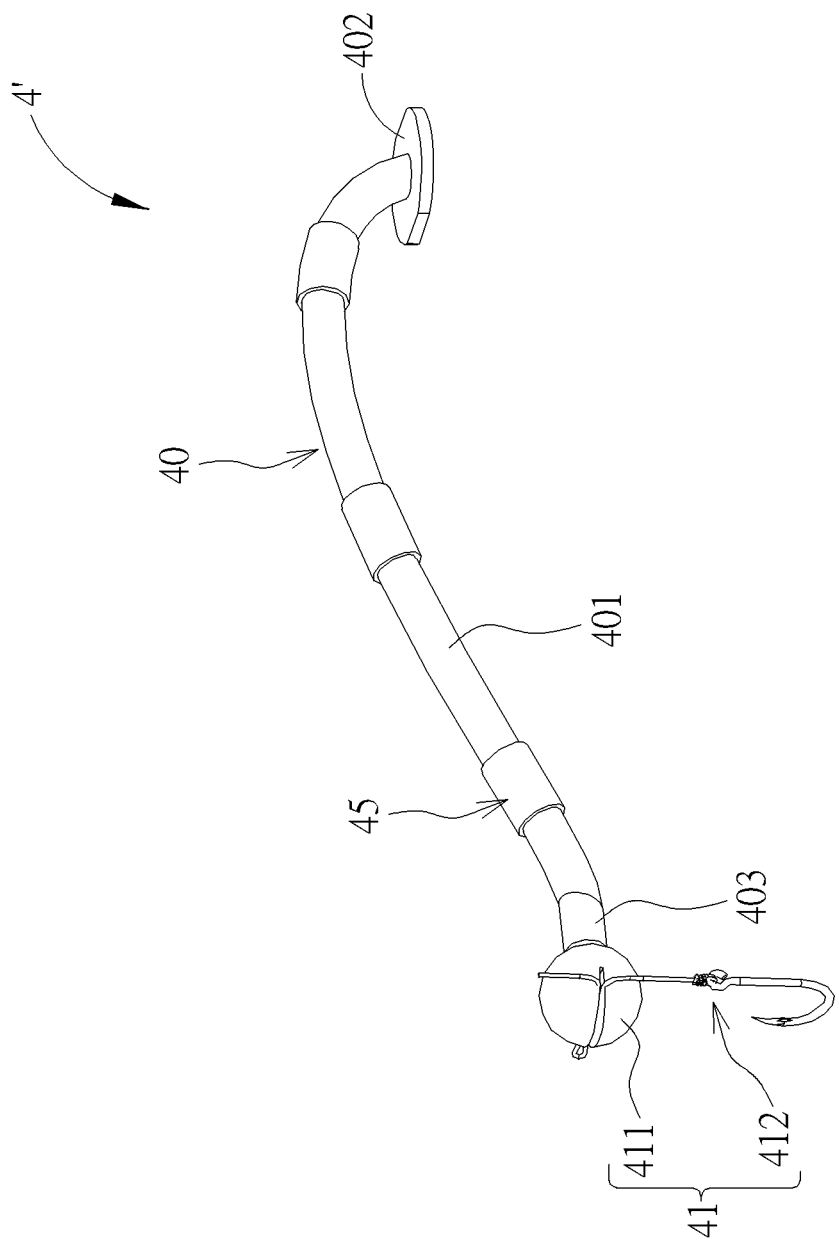
FIG. 21 is a diagram of a fishing device according to another embodiment of the present invention.

As shown in FIG. 17 and FIG. 18, the fish catching member set 41 includes a holding post 410, a fishing ball 411 and a fishing line-hook assembly 412. The holding post 410 protrudes from the second connecting end 403 of the fishing rod 40 and for engages with the fishing ball 411, so that the fishing ball 411 is able to bed installed on the holding post 410. The fishing line-hook assembly 412 is wound on the fishing ball 411. In such a manner, the fish catching member set 41 is able to fish by utilizing the fishing line-hook assembly 412. Please refer to FIG. 21. FIG. 21 is a diagram of a fishing device 4' according to another embodiment of the present invention. As shown in FIG. 21, the major difference between the fishing device 4' and the aforesaid fishing device 4 is that the fishing device 4' further includes a plurality of floating members 45. The floating members 45 are disposed on the rod body 401 of the fishing rod 40. A density of the floating member 45 is smaller than a density of water. Accordingly, when the fishing device 4' dives into the water, the floating members 45 helps provide the rod body 401 with buoyancy.

Figure 22:
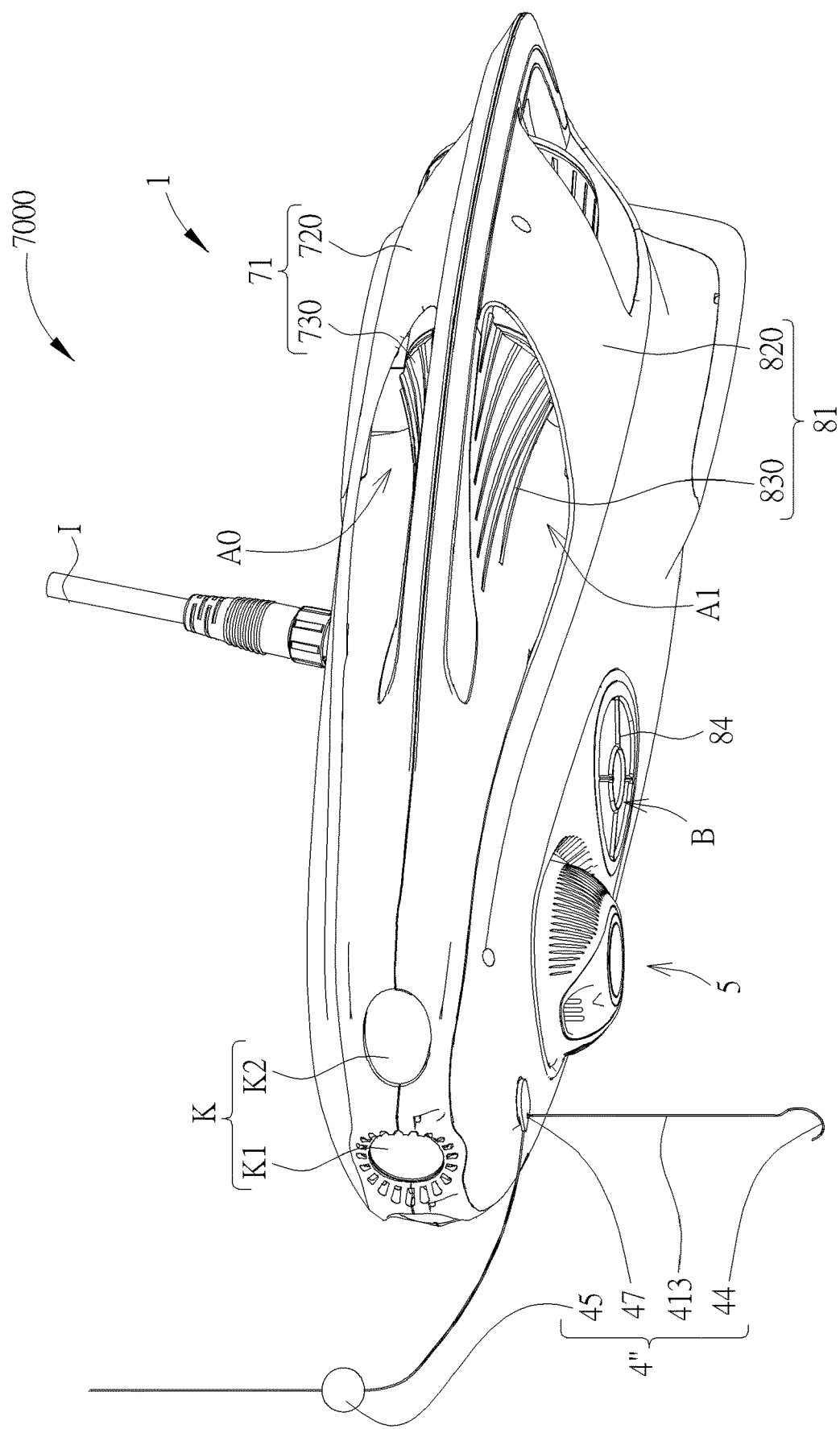
FIG. 22 is a diagram of an underwater drone according to a seventh embodiment of the present invention.

Please refer to FIG. 22. FIG. 22 is a diagram of an underwater drone 7000 according to a seventh embodiment of the present invention. As shown in FIG. 22, the major difference between the underwater drone 7000 and the aforesaid underwater drone 6000 is that a fishing device 4" of the underwater drone 7000 includes a device releasing unit 46, a device carrying unit 47 and a fish catching member set 41'. The device releasing unit 46 is disposed on the drone body 1 and coupled to the central processing unit 6. The device carrying unit 47 is detachably disposed on the device releasing unit 46. The fish catching member set 41' is installed on the device carrying unit 47 and for catching the fish.

Furthermore, the device releasing unit 46 is an electromagnetic module, and the device carrying unit 47 is made of permeable material. Accordingly, when the central processing unit 6 controls the device releasing unit 46 to be turned on, the device releasing unit 46 is able to attract the device carrying unit 47 for carrying the device carrying unit 47. On the other hand, when the central processing unit 6 controls the device releasing unit 46 to be turned off, the device releasing unit 46 distracts the device carrying unit 47 for releasing the device carrying unit 47. In such a manner, the central processing unit 6 is able to drive the device releasing unit 46 to release the device carrying unit 47, so as to release the fish catching member set 41' for catching the fish.

Figure 23:
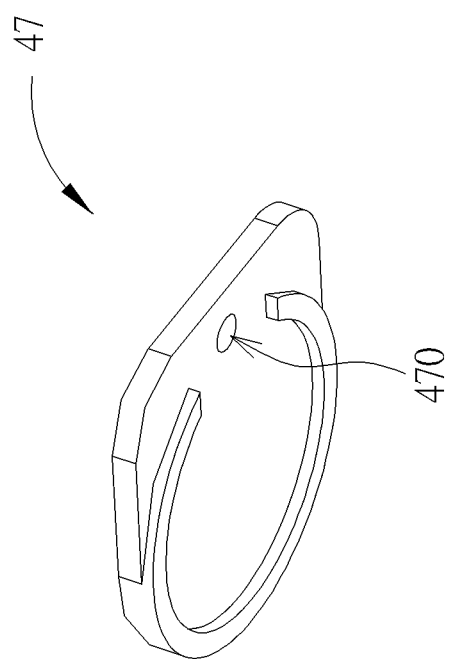
FIG. 23 is a diagram of a device carrying unit according to the seventh embodiment of the present invention.
Figure 24:
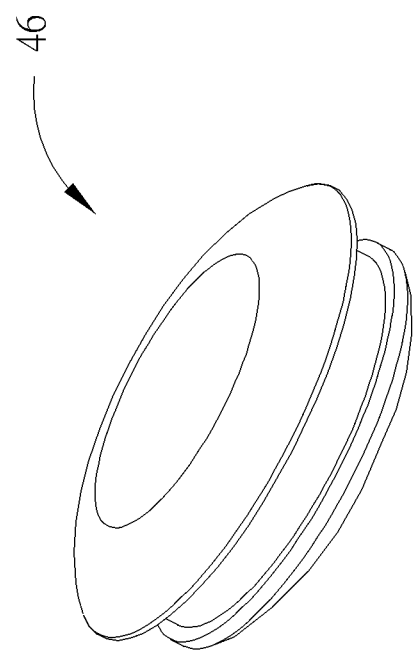
FIG. 24 is a diagram of a device releasing unit according to the seventh embodiment of the present invention.

Please refer to FIG. 23 and FIG. 24. FIG. 23 is a diagram of the device carrying unit 47 according to the seventh embodiment of the present invention. FIG. 24 is a diagram of the device releasing unit 46 according to the seventh embodiment of the present invention. As shown in FIG. 23 and FIG. 24, a connecting hole 470 is formed on the device carrying unit 47, and the fish catching member set 41' includes a fish line 413 and a fish hook 414. The fish line 413 is connected to the drone body 1 and disposed through the connecting hole 470, which enables connection of the fish line 413 and the drone body 1 via the device carrying unit 47. Namely, when the device releasing unit 46 is turned off, the fish line 413 with the fish hook 414 is released with separation of the device carrying unit 47 from the device releasing unit 46. It should be noticed that the fish catching member set 41' can further include a floating buoy 45, and the floating buoy 45 is installed on the fish line 413. When the floating buoy 45 floats on the surface of the water, the floating buoy 45 allows the user to tell where the underwater drone 7000 is.

Compared to the prior art, the underwater drone of the present invention includes the horizontal propeller module and the vertical propeller module to respectively provide the drone body with a horizontal proceeding force and a vertical lifting or diving force. Furthermore, the underwater drone of the present invention includes the horizontal channel and the vertical channel, which allow the water to pass through for reducing resistance when the underwater drone moves forwards, upwards or downwards. As a result, the underwater drone is capable of rapidly moving. Furthermore, the underwater drone of the present invention can be equipped with the buoy member with the antenna portion of the communication module disposed therein. As a result, the antenna portion of the communication module is able to establish the connection with the remote control in a wireless manner without being affected by signal decay by water. Furthermore, the underwater drone of the present invention can be equipped with the fishing device, the fish finding device and the image capturing module. It allows the user to find fish, capture images or recording videos, and catch the fish, which results in increase of interests of use of the underwater drone.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. An underwater drone with capacity of rapidly moving, comprising:
   a drone body with a longitudinal axis, the drone body being arranged along the longitudinal axis, the drone body comprising:
      an upper casing assembly;
      a lower casing assembly coupled with the upper casing assembly, an accommodating space being formed between the upper casing assembly and the lower casing assembly; and
      a drone kernel installed in the accommodating space;
   a horizontal propeller module disposed on the drone body and oriented substantially parallel to the longitudinal axis, the horizontal propeller module being for driving the drone body to move along the longitudinal axis or to rotate about a vertical axis perpendicular to the longitudinal axis; and
   a vertical propeller module disposed on the drone body and oriented substantially parallel to the vertical axis, the vertical propeller module being for driving the drone body to rotate a lateral axis perpendicular to the longitudinal axis and the vertical axis;
   wherein the horizontal propeller module is installed on the drone kernel and the vertical propeller module is installed on the drone kernel;
   wherein a side portion of the upper casing assembly, a side portion of the lower casing assembly and the horizontal propeller module cooperatively form a horizontal channel, and the horizontal channel allows liquids to pass through;
   wherein an upper opening is formed on the upper casing assembly, a lower opening is formed on the lower casing assembly, a kernel channel is formed on the drone kernel, the vertical propeller module is installed inside the kernel channel, the upper opening, the lower opening and the kernel channel cooperatively form a vertical channel, and the vertical channel allows the liquids to pass through.

2. The underwater drone of claim 1, wherein the upper casing assembly comprises:
   a top housing having a top channel structure located in a position corresponding to the horizontal propeller module, an upper portion of the horizontal channel being surrounded by the top channel structure; and
   an upper lateral housing for installing the top housing with the drone kernel, the upper lateral housing having an upper liquid guiding portion, the upper liquid guiding portion being connected to a propeller frond end of the horizontal propeller module and for guiding the liquids to the upper portion of the horizontal channel.

3. The underwater drone of claim 2, wherein the lower casing assembly comprises:
   a bottom housing having a bottom channel structure located in a position corresponding to the horizontal propeller module and the top channel structure, a lower portion of the horizontal channel being surrounded by the bottom channel structure; and a lower lateral housing for installing the bottom housing with the drone kernel, the lower lateral housing having a lower liquid guiding portion corresponding to the upper liquid guiding portion, the lower liquid guiding portion being connected to the propeller frond end of the horizontal propeller module and for guiding the liquids to the lower portion of the horizontal channel.

4. The underwater drone of claim 1, wherein the upper casing assembly further comprises:

an upper filter structure disposed in the upper opening and for filtering an object from entering the kernel channel via the upper opening.

5. The underwater drone of claim 4, wherein the lower casing assembly further comprises:

a lower filter structure disposed in the lower opening and for filtering the object from entering the kernel channel via the lower opening.

6. The underwater drone of claim 1, wherein the drone body has a drone front end and a drone rear end, the longitudinal axis passes through the drone front end and the drone rear end, a distance between the horizontal propeller module and the drone rear end is smaller than a distance between the horizontal propeller module and the drone front end, the vertical propeller module is disposed between the drone front end and a gravity center of the underwater drone along the longitudinal axis.

7. The underwater drone of claim 1, further comprising:
a remote terminal;
an image capturing module disposed on the drone body, the image capturing module being for capturing images or recording videos;
a fish finding device installed on the drone body and for finding the location at which fish are, the fish finding device comprising:
 a sonar module for emitting sound waves and for receiving the reflected sound waves; and
 a fish attracting module coupled with the sonar module, the fish attracting module illuminating for attracting the fish;
a communication module coupled with the drone body and for establishing communication with the remote terminal; and
a central processing unit coupled with the image capturing module, the fish finding device and the communication module, the central processing unit being for controlling the image capturing module and the fish finding device according to the communication between the communication module and the remote terminal.

8. The underwater drone of claim 7, further comprising:
a cable connecting the drone body with the remote terminal, the remote terminal being coupled with the communication module and the central processing unit via the cable.

* * * * *